(12) United States Patent
Niwa et al.

(10) Patent No.: US 9,507,657 B2
(45) Date of Patent: Nov. 29, 2016

(54) INVESTIGATION PROGRAM, INFORMATION PROCESSING APPARATUS, AND INFORMATION PROCESSING METHOD

(71) Applicant: FUJITSU LIMITED, Kawasaki-shi, Kanagawa (JP)

(72) Inventors: Hideyuki Niwa, Numazu (JP); Hiroyuki Kamezawa, Numazu (JP); Yasuo Ueda, Numazu (JP); Yuichi Nagahama, Numazu (JP); Hidetoshi Seto, Nagaizumi (JP); Taku Izumi, Numazu (JP); Yasuaki Ishimatsu, Numazu (JP); Ken Ichikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/552,818

(22) Filed: Nov. 25, 2014

(65) Prior Publication Data
US 2015/0160994 A1 Jun. 11, 2015

(30) Foreign Application Priority Data
Dec. 10, 2013 (JP) ................................. 2013-254864

(51) Int. Cl.
G06F 11/00 (2006.01)
G06F 11/07 (2006.01)
G06F 11/14 (2006.01)

(52) U.S. Cl.
CPC ....... *G06F 11/0778* (2013.01); *G06F 11/0706* (2013.01); *G06F 11/1417* (2013.01); *G06F 2201/82* (2013.01)

(58) Field of Classification Search
CPC .................................................. G06F 11/0778
USPC .............................. 714/15, 16, 19, 20, 38.11
See application file for complete search history.

(56) References Cited

U.S. PATENT DOCUMENTS

| | | | |
|---|---|---|---|
| 6,173,417 B1 | 1/2001 | Merrill | |
| 2006/0041739 A1* | 2/2006 | Iwakura | G06F 11/073 713/2 |
| 2008/0133968 A1* | 6/2008 | Muppirala | G06F 11/0778 714/13 |
| 2009/0024820 A1* | 1/2009 | Ponnuswamy | G06F 11/0778 711/170 |

FOREIGN PATENT DOCUMENTS

| | | |
|---|---|---|
| JP | 2001-229053 | 8/2001 |
| JP | 2002-513964 | 5/2002 |
| JP | 2006-072997 | 3/2006 |
| JP | 2007-193414 | 8/2007 |
| JP | 2009-032252 | 2/2009 |
| WO | 99/57632 | 11/1999 |

\* cited by examiner

*Primary Examiner* — Dieu-Minh Le
(74) *Attorney, Agent, or Firm* — Fujitsu Patent Center

(57) ABSTRACT

A non-transitory computer readable storage medium that stores therein an investigation program for causing an information processing apparatus to execute processing, the processing includes creating, in a storage medium, a first dump file for writing out data in a memory in the information processing apparatus when an operating system detects a first abnormality, rebooting the information processing apparatus without erasing the data stored in the memory after the detection of the first abnormality and after the creation of the first dump file, creating, during the reboot, a first table that associates a plurality of page areas in the memory and a plurality of dump file areas in the first dump file that correspond to the page areas, and writing out, when a page area in the memory is released, data stored in the page area to the first dump file.

12 Claims, 32 Drawing Sheets

INVESTIGATION PROGRAM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2013-254864, filed on Dec. 10, 2013, the entire contents of which are incorporated herein by reference.

FIELD

The present invention relates to an investigation program, an information processing apparatus, and an information processing method.

BACKGROUND

When an operating system (OS) detects an abnormality in an operating system, a dump file is created. The dump file records data stored in a memory, a register in a CPU, a disk and the like at an instance when the abnormality is detected. The dump file is used to perform an investigation of a cause of the detected abnormality (see, for example, Japanese Patent Application Laid-Open No. 2007-193414).

When the OS detects occurrence of an abnormality of the system, depending on details of the abnormality, reboot (restart) is performed in order to cause the system to normally operate. When the reboot is performed, contents stored in the memory are sometimes erased because of the needs for securing a memory capacity used for the reboot. Therefore, the data in the memory is collected in the dump file before the reboot of the system is performed.

When the abnormality of the system occurs, since the reboot is performed after the data in the memory is stored in the dump file, services and the like related to the system are stopped for a long time. Therefore, in order to prevent occurrence of damage or expansion of the damage involved in the collection of the data in the memory, it is demanded to reduce time consumed until the reboot of the system (hereinafter, downtime of the system) as much as possible and quickly perform restoration of the system to a normal operation.

However, (1) some server systems appearing in these days have a memory capacity of several terabytes. The collection of the dump file (specifically, write-out of the data in the memory to a storage medium different from the memory) tends to consume a long time. Therefore, the restoration of the system is delayed by the collection of the dump file, causing prolongation of the downtime of the system. (2) In order to reduce the collection time for the dump file, a method of performing the reboot without erasing the contents stored in the memory during the reboot of the system is conceivable. However, the data left in the memory during the restart is unable to be recognized from the OS after the restart. Therefore, even if the reboot is performed without erasing the data stored in the memory, the dump file is unable to be created after the restart. (3) Further, as a result of consuming a long time for the collection of the dump file, the start of an analysis of contents of the dump file is also delayed. Therefore, a delay occurs in specifying a cause of a system abnormal end. As a result, the restoration of the system is further delayed.

SUMMARY

Therefore, it is an object of an embodiment to provide an investigation program, an information processing apparatus, and an information processing method for reducing downtime of a system when an abnormal end involving reboot of the system occurs.

One aspect of the embodiment is A non-transitory computer readable storage medium that stores therein an investigation program for causing an information processing apparatus to execute processing comprising:

creating, in a storage medium, a first dump file for writing out data in a memory in the information processing apparatus when an operating system detects a first abnormality;

rebooting the information processing apparatus without erasing the data stored in the memory after the detection of the first abnormality and after the creation of the first dump file;

creating, during the reboot, a first table that associates a plurality of page areas in the memory and a plurality of dump file areas in the first dump file that correspond to the page areas; and writing out, when a page area in the memory is released, data stored in the page area to being released the first dump file.

It is possible to reduce downtime of a system when an abnormal end involving reboot of the system occurs.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Configuration of a Test System

Figure 1:
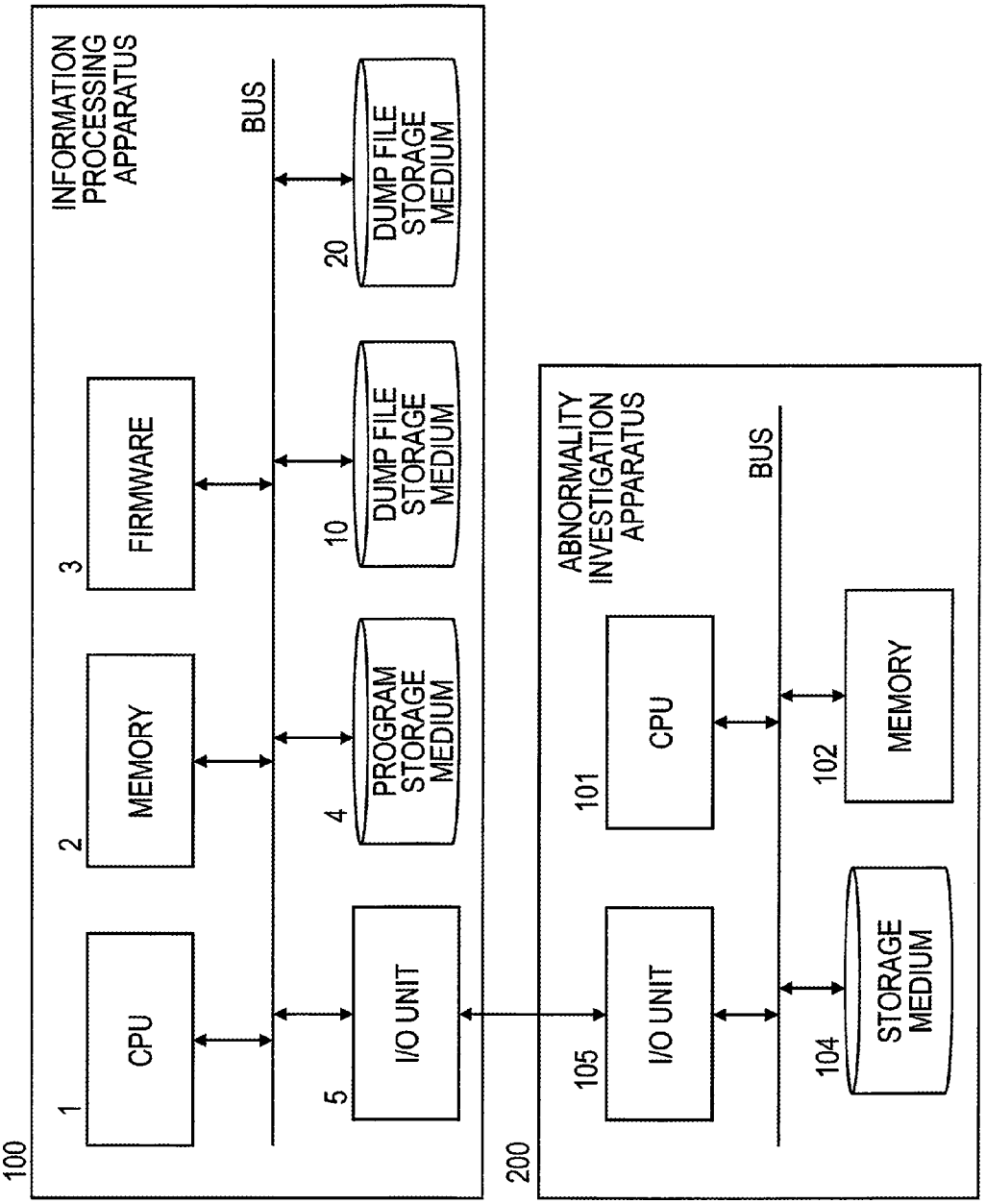
FIG. 1 is a diagram depicting hardware configurations of an information processing apparatus and an abnormality investigation apparatus in the present embodiment.

FIG. 1 is a diagram depicting hardware configurations of an information processing apparatus and an abnormality investigation apparatus in the present embodiment. As depicted in FIG. 1, an information processing apparatus 100 and an abnormality investigation apparatus 200 can be connected via, for example, a communication network (not depicted in the figure).

The information processing apparatus 100 (also referred to as system) includes a CPU 1, which is a processor, a memory 2, an external interface 5 (an I/O unit), and a program storage medium 4 that stores software 410 (a computer program) explained below with reference to FIG. 2. The CPU 1, the memory 2, the external interface 5, and the program storage medium 4 are connected via a BUS. The program storage medium 4 is, for example, a HDD from which software can be read out. The information processing apparatus 100 includes dump file storage media 10 and 20 (hereinafter also referred to as storage media 10 and 20 or first storage medium 10 and second storage medium 20) to which, when an OS (not depicted in the figure) stored in the memory 2 (not depicted in the figure) detects an abnormality (also referred to as first abnormality) in the information processing apparatus 100, a state of memory 2 during occurrence of the abnormality is written out. The dump file storage media 10 and 20 are connected to the memory 2 and the like via the BUS. Note that, in FIG. 1, the information processing apparatus 100 includes two dump file storage media. However, the information processing apparatus 100 is not limited to this example and may include one or three or more dump file storage media. The program storage medium 4 and the dump file storage media 10 and 20 may be configured by a single storage medium.

The abnormality investigation apparatus 200 includes a CPU 101, which is a processor, a memory 102, an external interface 105 (an I/O unit), and a storage medium 104 that stores software for investigating data stored in the dump file storage media 10 and 20. The CPU 101, the memory 102, the external interface 105, and the storage medium 104 are connected via a BUS. Like the storage media 4, 10 and 20 of the information processing apparatus 100, the storage medium 104 is, for example, a HDD from which software can be read out.

Figure 2:
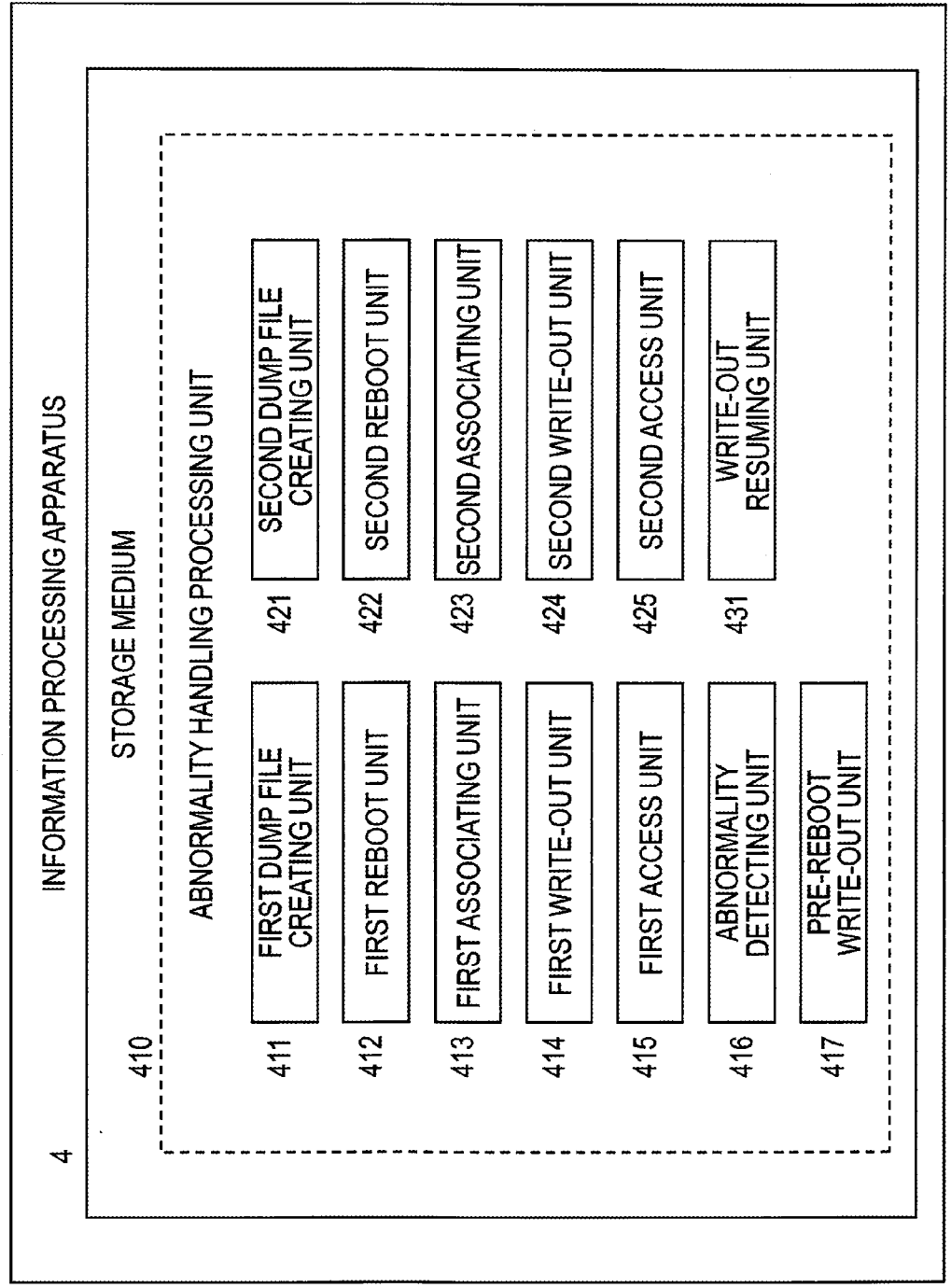
FIG. 2 is a diagram depicting an example of functions of the software of the information processing apparatus.

FIG. 2 is a diagram depicting an example of functions of the software of the information processing apparatus. For example, the information processing apparatus 100 returns requested data to the abnormality investigation apparatus 200 in response to access from the abnormality investigation apparatus 200. The information processing apparatus 100 includes the software 410 (hereinafter referred to as abnormality handling processing unit) in the storage medium 4 in addition to hardware such as a not-depicted CPU. When an abnormality for which reboot of the information processing apparatus 100 is needed occurs, the software 410 creates, in the dump file storage media 10 and 20, a dump file of data stored in the memory 2. After the reboot of the information processing apparatus 100, the software 410 writes out the data stored in the memory 2 to the dump file and enables access to the data stored in the memory 2 or the dump file storage media 10 and 20. Note that the software 410 can be classified into an OS program started by the OS stored in the memory 2 of the information processing apparatus 100 or a firmware program started by firmware 3 (e.g., BIOS) of the information processing apparatus 100.

The software 410 includes a first dump file creating unit 411 (a program of the OS; also referred to as processing unit 411) that creates, for example, when an abnormality occurs, for example, in the storage medium 10 (the first storage medium), a first dump file for writing out the data in the memory 2 created in the dump file storage medium 10 depicted in FIG. 1. The software 410 includes a first reboot unit 412 (a firmware program; also referred to as processing unit 412) that reboots the information processing apparatus 100 without erasing the data stored in the memory 2 after the abnormality occurs (the abnormality is detected) and after the first dump file is created. The software 410 includes a first associating unit 413 (an OS program; also referred to as processing unit 413) that creates, during the reboot, an association table of a page area where the data in the memory 2 is stored and a dump file area in the first dump file to which the data is written out and a first write-out unit 414 (an OS program; also referred to as processing unit 414) that writes out, when the page area in the memory 2 is released, the data stored in the page area to the first dump file. The software 410 includes a first access unit 415 (an OS program; also referred to as processing unit 415) that accesses the memory 2 or the first dump file referring to the association table in response to an access request to the first dump file (e.g., an access request from a computer program in the abnormality investigation apparatus 200 or the information processing apparatus 100) and an abnormality detecting unit 416 (an OS program) that detects an abnormality that occurs in the information processing apparatus 100. Further, the software 410 includes a pre-reboot write-out unit 417 (an OS program) that writes out, before the reboot by the first reboot unit 412, to the first dump file, data stored in a page area having a size equivalent to an area to which an OS and the like for the reboot is loaded.

The software 410 includes a second dump file creating unit 421 (an OS program) that creates, for example, in the storage medium 20 (the second storage medium), a second dump file to which the data in the memory 2 created in the dump file storage medium 20 depicted in FIG. 1 is written out, for example, when another abnormality different from the abnormality already detected by the abnormality detecting unit 416 (also referred to as second abnormality) occurs during the execution of the first write-out unit 414. The software 410 includes a second reboot unit 422 (a firmware program) that reboots the information processing apparatus 100 without erasing the data stored in the memory 2 after the creation of the second dump file. The software 410 includes a second associating unit 423 (an OS program) that creates, during the reboot, an association table of a page area where the data is stored in the memory 2 and a dump file area in the second dump file to which the data is written out and a second write-out unit 424 (an OS program) that writes out, when the OS releases the page area in the memory 2, to the second dump file, the data stored in the page area. Further, the software 410 includes a second access unit 425 (an OS program) that accesses the memory 2 or the second dump file referring to the association table in response to an access to the second dump file.

The software 410 includes a write-out resuming unit 431, which is an OS program, that writes out, to the first dump file, for example, data stored in a page area indicating that a flag (a first flag) indicating that data stored in the page area among page areas associated by a first memory management structure is not written out to the first dump file.

[Time of Shutdown Normally Performed During Abnormality Occurrence]

Figure 3:
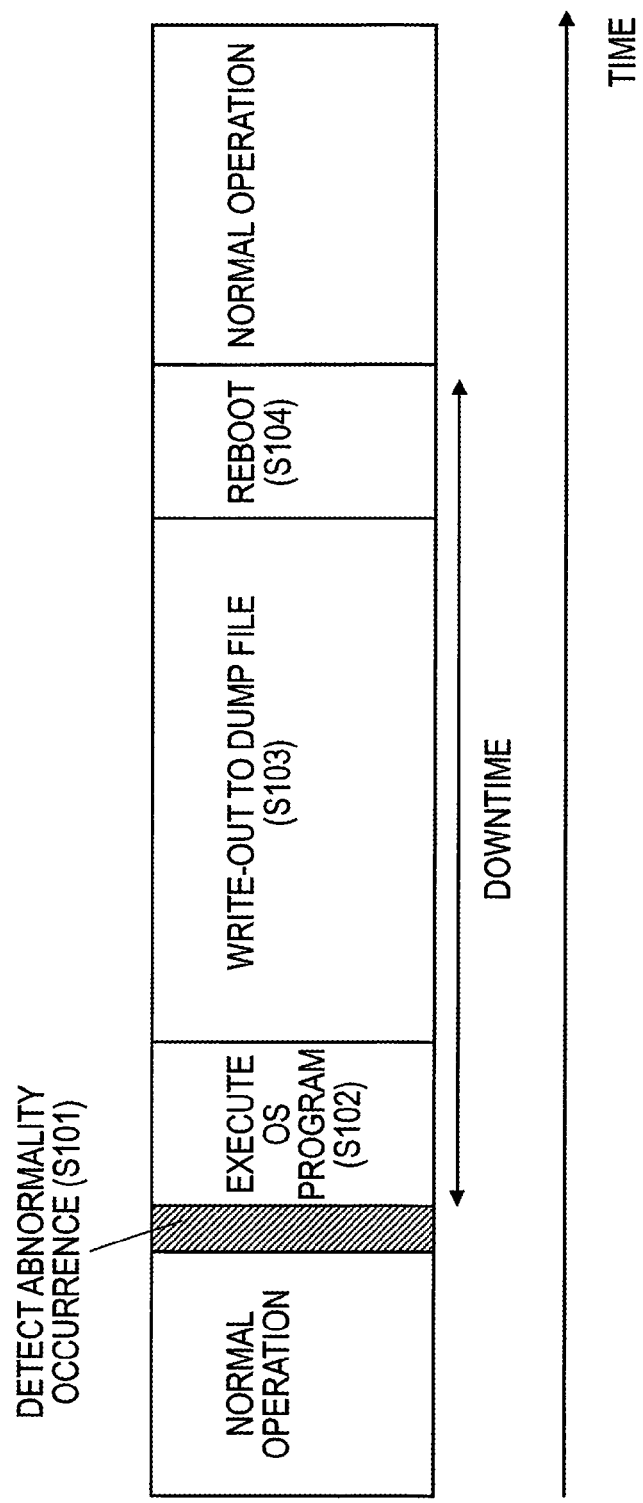
FIG. 3 is a diagram for explaining time of shutdown normally performed during abnormality occurrence.

FIG. 3 is a diagram for explaining time of shutdown normally performed during abnormality occurrence. As depicted in FIG. 3, when an abnormality occurs during a normal operation of the information processing apparatus 100 (S101), an OS program for executing reboot of the information processing apparatus 100 and writing out the data stored in the memory 2 to a dump file is started (S102). According to execution of the OS program, the OS writes out the data in the memory 2 to the dump file (S103) and executes the reboot of the information processing apparatus 100 (S104). In performing the reboot of the information processing apparatus 100, the OS or the firmware sometimes erases the data stored in the memory 2 in order to secure a memory capacity used for the reboot. Therefore, as depicted in FIG. 3, the write-out to the dump file (S103) is executed before the reboot of the information processing apparatus 100 is performed. That is, time after the occurrence of the abnormality of the information processing apparatus 100 until the write-out of the data in the memory 2 to the dump file and the reboot of the information processing apparatus 100 are completed is a downtime of the information processing apparatus 100.

In abnormality handling processing depicted in FIG. 3, the OS is unable to reboot the information processing apparatus 100 until the write-out of the data in the memory 2 to the dump file is completed. Therefore, when a long time is consumed for the write-out of the data in the memory 2 to the dump file, restoration of the information processing apparatus 100 is delayed by the write-out to the dump file. This causes prolongation of the downtime of the information processing apparatus 100. Even if the OS or the firmware performs the reboot without erasing contents in the memory 2 during the reboot of the information processing apparatus 100, the OS is unable to recognize the data left in the memory 2 after the reboot. Therefore, after the reboot of the information processing apparatus 100, the OS is unable to create the dump file on the basis of the data left in the memory 2. Further, as a result of consuming a long time for the write-out to the dump file, the start of an analysis of contents of the dump file is delayed.

Therefore, in this embodiment, after the abnormality occurrence of the information processing apparatus 100, the OS performs the reboot of the information processing apparatus 100 without erasing the data stored in the memory 2. The OS after the reboot is enabled to recognize data not written out to the dump file before the reboot of the information processing apparatus 100.

First Embodiment

Figure 4:
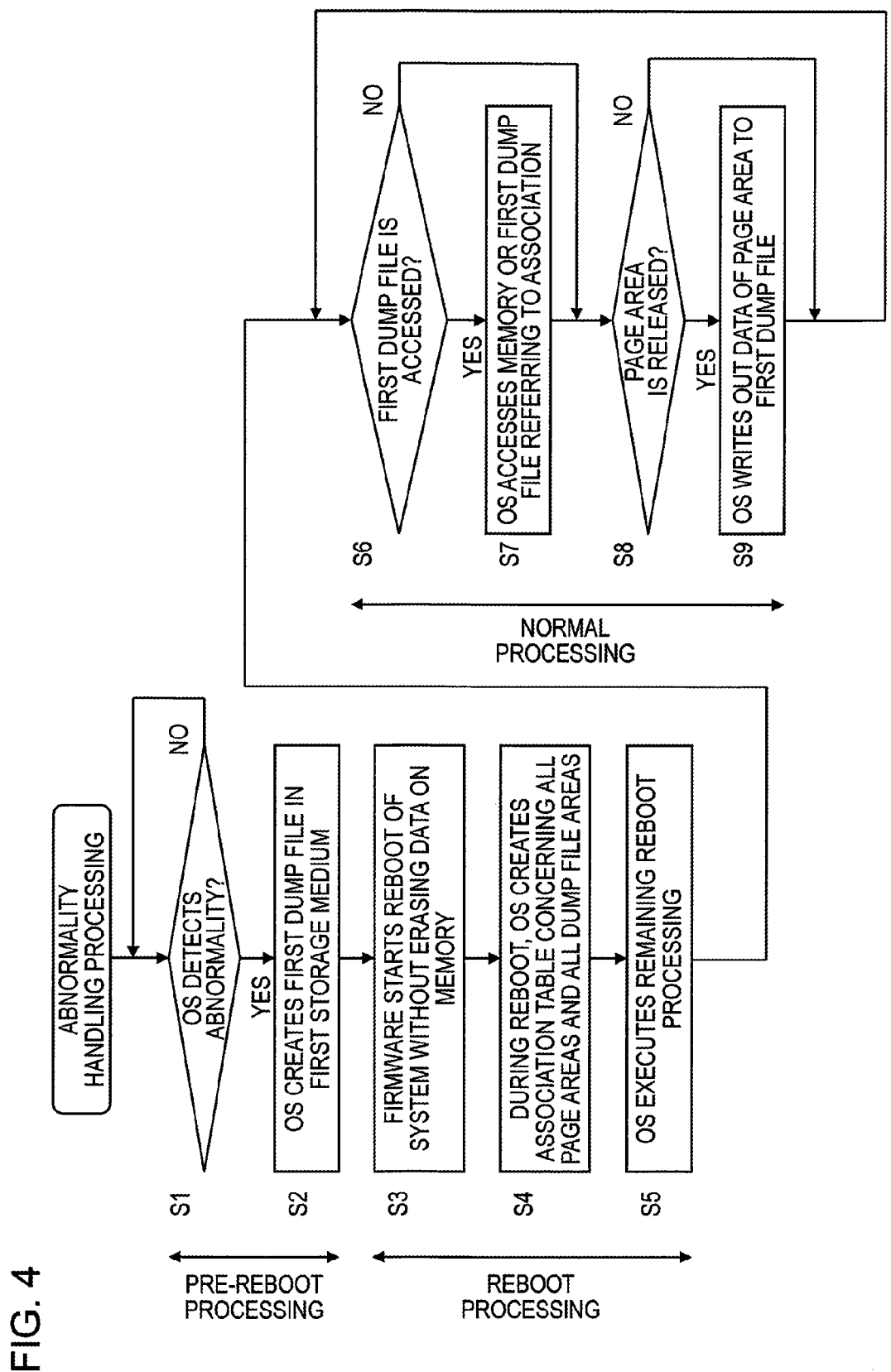
FIG. 4 is a flowchart for explaining an overview of abnormality handling processing.
Figure 5:
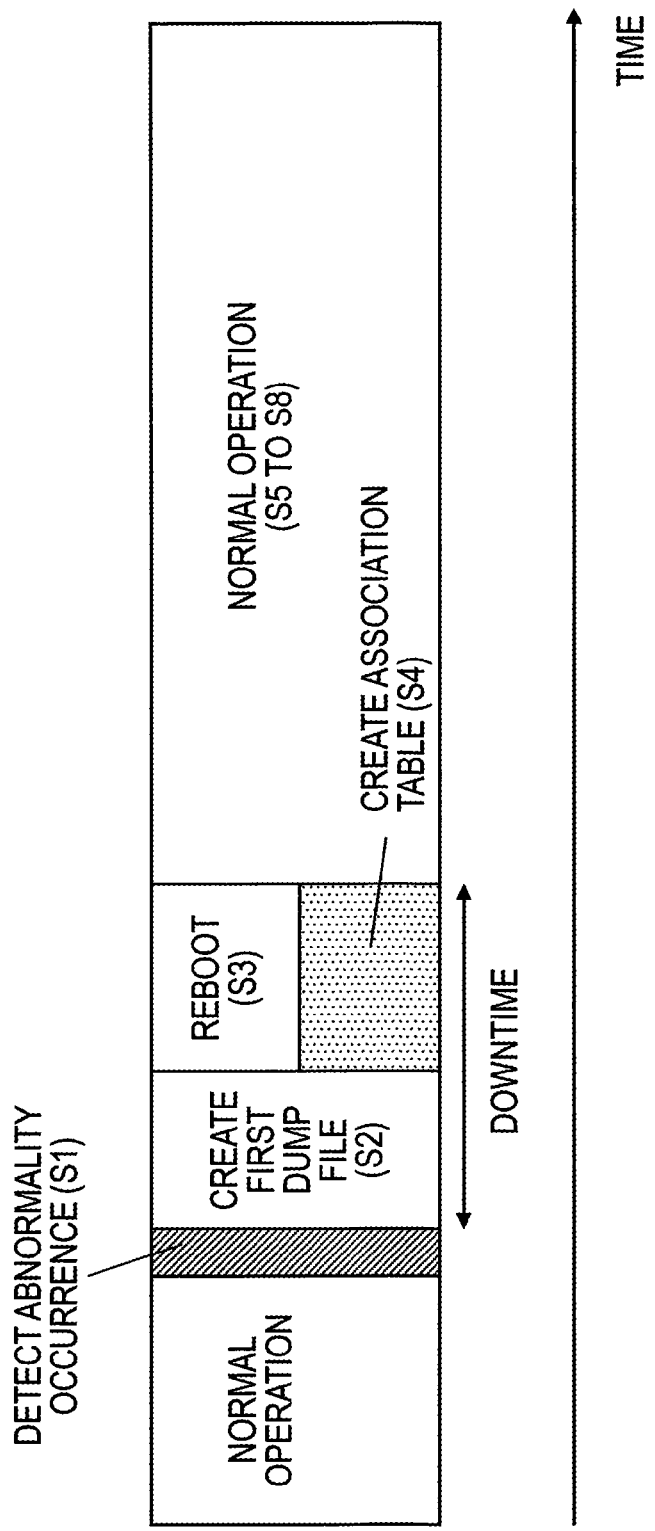
FIG. 5 is a diagram for explaining a shutdown time during abnormality occurrence in this embodiment.
Figure 6:
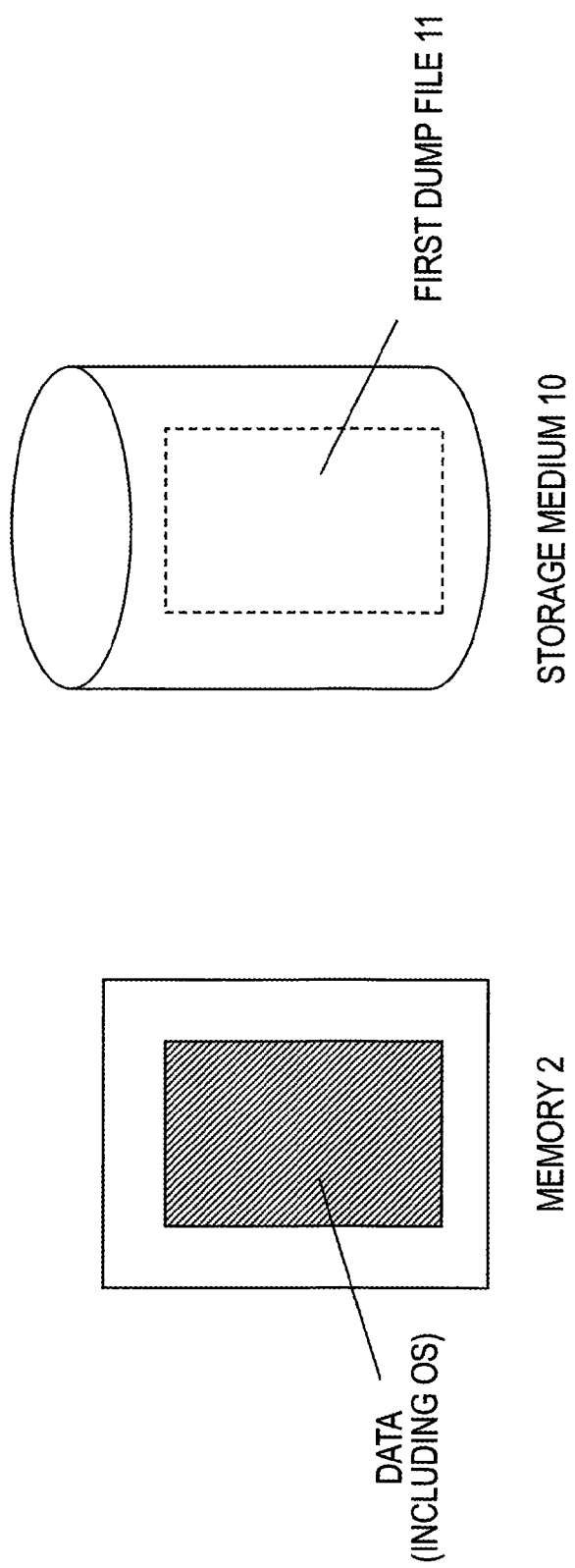
FIG. 6 is a diagram for explaining the overview of the abnormality handling processing.
Figure 7:
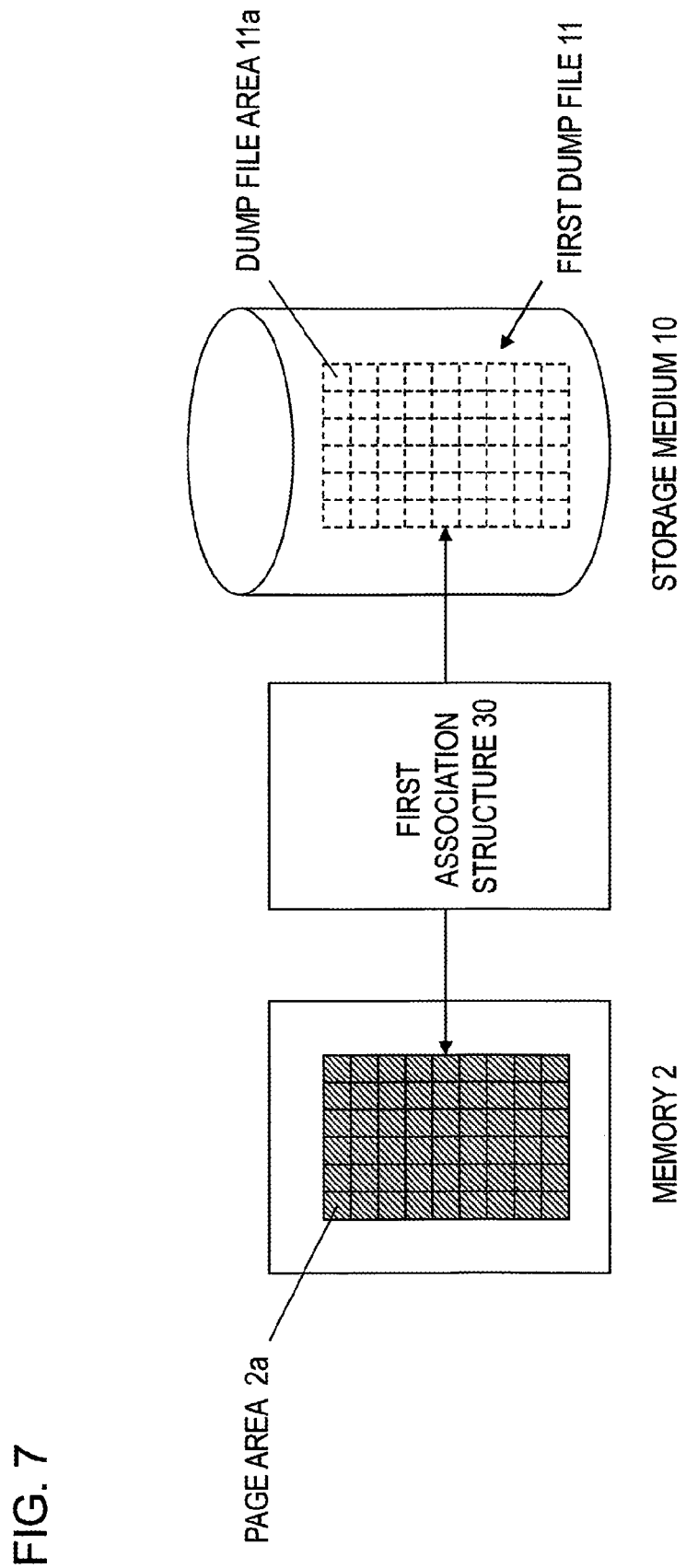
FIG. 7 is a diagram for explaining the overview of the abnormality handling processing.
Figure 8:
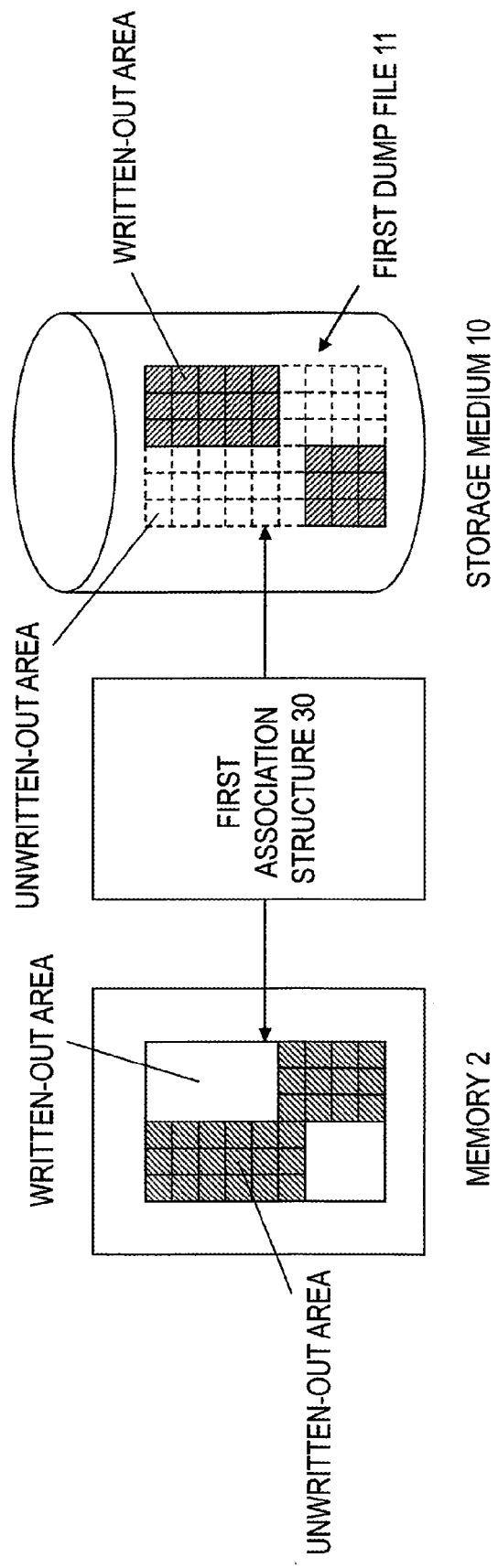
FIG. 8 is a diagram for explaining the overview of the abnormality handling processing.

First, a first embodiment is explained. FIG. 4 is a flowchart for explaining an overview of abnormality handling processing. FIG. 5 is a diagram for explaining a shutdown time during abnormality occurrence in this embodiment. FIGS. 6 to 8 are diagrams for explaining the overview of the abnormality handling processing. The overview of the abnormality handling processing depicted in FIG. 4 and the shutdown time during the abnormality occurrence depicted in FIG. 5 are explained with reference to FIGS. 6 to 8. Note that, in the following explanation, it is assumed that the OS of the information processing apparatus 100 is stored in the memory 2.

[S1 and S2 in FIGS. 4 and 5]

First, the abnormality detecting unit 416 of the OS of the information processing apparatus 100 performs detection of an abnormality that occurs in the information processing apparatus 100 (S1). As the detection of an abnormality, for example, when a monitoring process arranged to detect an abnormality detect an abnormality, the monitoring process only has to notify the abnormality detecting unit 416 of the OS.

Subsequently, the first dump file creating unit 411 of the OS of the information processing apparatus 100 creates, in the storage medium 10, a first dump file 11 for writing out the data in the memory 2 when the abnormality detecting unit 416 of the OS detects an abnormality in the information processing apparatus 100 (when the abnormality detecting unit 416 detects an abnormality for which reboot of the information processing apparatus 100 is needed) (S2). FIG. 6 is a diagram for explaining the case when the OS detects an abnormality in the information processing apparatus 100. When the abnormality detecting unit 416 of the OS detects an abnormality in the information processing apparatus 100, the first write-out unit 414 of the OS needs to write out, to the first dump file 11, data stored in the memory 2 at an instance when the abnormality occurs. Therefore, the first dump file creating unit 411 creates the first dump file 11 in an area in the storage medium 10 and secures, in the storage medium 10, a storage area for writing out the data in the memory 2. Note that the first dump file creating unit 411 may create the first dump file 11 in the storage medium 10 in advance before the abnormality detecting unit 416 detects an abnormality.

In order to create an association table explained in S4, the first dump file creating unit 411 of the OS creates the first dump file 11 before the reboot explained in S3 is performed.

Further, the first dump file 11 is a storage area for writing out the data in the memory 2 at an instance with the abnormality occurs. The first dump file creating unit 411 of the OS creates the first dump file 11 to have a capacity same as a data capacity that can be stored in the memory 2.

[S3 in FIGS. 4 and 5]

Referring back to FIG. 4, after the creation of the first dump file 11, the first reboot unit 412 in the firmware 3 of the information processing apparatus 100 reboots the information processing apparatus 100 without erasing the data in the memory 2 (S3). Specifically, after creating the first dump file 11 (S1), the OS that detects the abnormality shuts down the information processing apparatus 100 in order to change a system configuration according to the occurred abnormality without erasing the data in the memory 2. Thereafter, the firmware 3 and the OS of the information processing apparatus 100 reboot in the order of the firmware 3 and the OS (S3). Therefore, control performed before the reboot of the OS such as securing of an area for the OS reboot is performed by the firmware 3.

[S4 and S5 in FIGS. 4 and 5]

Subsequently, the associating unit 413 of the OS of the information processing apparatus 100 creates, during the reboot by the first reboot unit 412, an association table of page areas where the data in the memory 2 is stored and dump file areas in the first dump file 11 to which the data is written out (S4).

FIG. 7 is a diagram for explaining the association table. An association table 30 (also referred to as a first association structure 30 or first table 30) includes information for associating a page area 2a in the memory 2 and a dump file area 11a in the first dump file 11 to which data stored in the page area 2a is written out. Specifically, the association table 30 includes information for associating an address of a page area where certain data is stored and an address of a dump file area to which the data is scheduled to be written out and a flag (a first flag) indicating whether the data stored in the page area is written out to the dump file area. Note that the first dump file 11 has a capacity same as a data capacity storable in the memory 2. Therefore, the number of page areas 2a in the memory 2 and the number of dump file areas 11a in the first dump file 11 are the same number. Data capacities storable in the memory 2 and the first dump file 11 are the same.

In the first association structure 30, at the point in time of the reboot, data stored in page areas in the memory 2 is not written out to a dump file. Therefore, during creation of the first association structure 30, the first associating unit 413 of the OS sets first flags in all the page areas to a state indicating that the data is not written out to a dump file area (hereinafter referred to as unwritten-out state or a dirty state). Consequently, the data in the memory 2 is initialized as a file cache of the first dump file 11.

Further, the first write-out unit 414 of the OS explained in S8 and S9 erases the first association structure 30 when a page area in the memory 2 corresponding thereto is released. Consequently, it is possible to determine, by checking the presence of the first association structure 30, write-out of data corresponding to the first association structure 30 to the dump file is completed. That is, when the first association structure 30 referred to is present, it is possible to determine that the write-out to the dump file is not completed. When the first association structure 30 is absent, it is possible to determine that the write-out to the dump file is completed. Details of the operation of the first association structure 30 are explained in S6 to S9.

Further, after creating the first association structure 30 (S4), the OS executes the remaining reboot processing and completes the reboot of the information processing apparatus 100 (S5).

In this embodiment, the first dump file creating unit 411 of the OS creates, before the reboot of the information processing apparatus 100, the first dump file 11 having a capacity same as the data capacity storable in the memory 2. The first reboot unit 412 of the OS reboots the information processing apparatus 100 without erasing the data in the memory 2. During the reboot, the first associating unit 413 of the OS associates the page area 2a in the memory 2 and the dump file area 11a in the first dump file 11.

[S6 and S7 in FIGS. 4 and 5]

Referring back to FIG. 4, during a normal operation after the reboot, when the first dump file 11 is accessed (YES in S6), the first access unit 415 of the OS of the information processing apparatus 100 accesses the memory 2 or the first dump file 11 referring to the first association structure 30 (S7). Specifically, when the first association structure 30 referred to is present, the first associating unit 413 of the OS does not write out access target data to the first dump file 11. Therefore, the first access unit 415 of the OS acquires, further referring to the first association structure 30, an address of a page area in the memory 2 where the access target data is stored and accesses the data in the address. When the first association structure 30 referred to is absent, the first associating unit 413 of the OS writes out the access target data to the first dump file 11. Therefore, the first access unit 415 of the OS acquires, further referring to the first association structure 30, an address of a dump file area in the first dump file 11 where the access target data is stored and accesses the data in the address.

Specifically, in the case of FIG. 7, the first associating unit 413 of the OS has not written out the data in the memory 2 to the first dump file 11 yet. Therefore, the first access unit 415 of the OS accesses the page area in the memory 2 referring to the first association structure 30.

On the other hand, in the case of FIG. 8, the first associating unit 413 of the OS has written out a part of the data stored in the page area in the memory 2 to the dump address area of the first dump file 11. Therefore, in the case of FIG. 8, a written-out area and an unwritten-out area are mixed in the first dump file 11. When the first association structure 30 referred to is present, the first access unit 415 of the OS acquires, further referring to the first association structure 30, an address of a page area in the memory 2 where the access target data is stored and accesses the data in the address. When the first association structure 30 referred to is absent, the first access unit 415 acquires, further referring to the first association structure 30, an address of the dump file area in the first dump file 11 where the access target data is stored and accesses the data in the address. Processing of the OS for the access to the first dump file 11 is equivalent to access control for a general file cache.

[S8 and S9 in FIGS. 4 and 5]

Referring back to FIG. 4, when a page area in the memory 2 is released (YES in S8), if the first flag of the first association structure 30 indicates the unwritten-out state, the first write-out unit 414 of the OS of the information processing apparatus 100 writes out data stored in the page area to the first dump file (S9). During the reboot of the information processing apparatus 100, all data is stored in the page area in the memory 2 and is not written out to the dump file area in the first dump file 11. During the normal operation after the reboot, the page area in the memory 2 where the data is stored is released by the OS and used for another use (execution of another program, etc.) when an area in the memory 2 is insufficient. At this point, the first write-out unit 414 of the OS writes out the data in the memory 2 to the first dump file 11 for the first time. This is equivalent to an operation of the general file cache.

Figure 9:
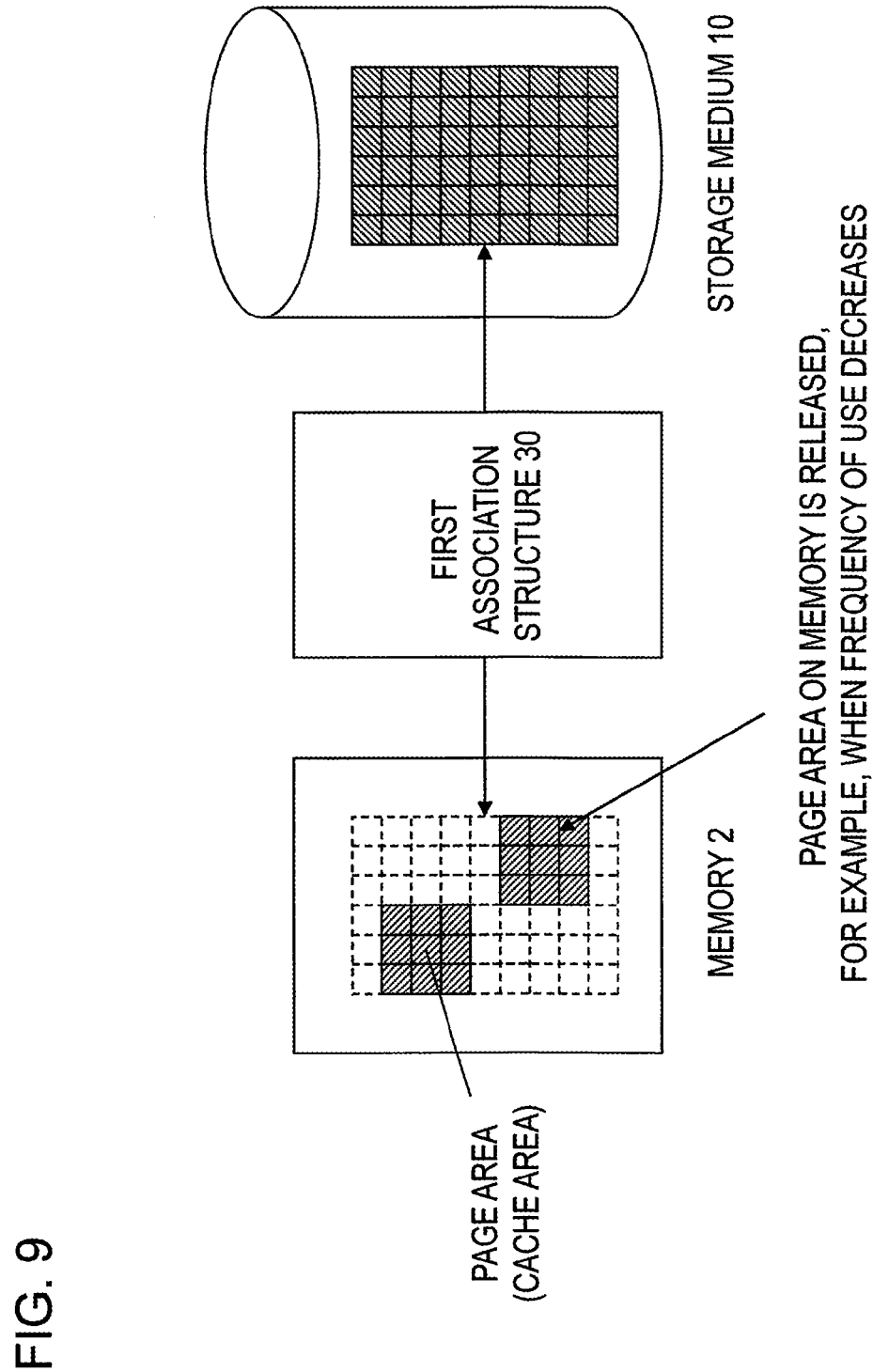
FIG. 9 is a diagram for explaining release of a page area in the memory.

FIG. 9 is a diagram for explaining release of a page area in the memory. First, the general file cache is explained. In the file cache, as depicted in FIG. 9, the OS writes out data having a high frequency of use among data stored in the storage medium 10 to a page area in the memory 2. In general, it takes time to access data stored in a storage medium such as a HDD (access is low speed) and access time to data stored in a memory is short (access is high speed). Therefore, by writing out the data having a high frequency of use to the memory, it is possible to reduce time consumed for entire processing including the access to the data.

A storage capacity in the memory 2 is small compared with a storage capacity of the storage medium, when a usable area in the memory 2 is insufficient, for example, it is needed to erase or overwrite the data in order from data, a frequency of use of which decreases, or data not accessed for a long time. This is processing for releasing the page area in the memory 2.

In control of the file cache depicted in FIG. 9, it is needed to manage information concerning data cached and stored in the page area in the memory 2 among the data stored in the storage medium 10. Therefore, as depicted in FIG. 9, the first association structure 30 is provided as in FIGS. 7 and 8. For example, when the abnormality investigation apparatus 200 accesses data stored in the storage medium 10, the first access unit 415 of the OS checks, referring to the first association structure 30, whether the access target data is stored (cached) in the page area in the memory 2. When the access target data is stored in the memory 2, the first access unit 415 acquires, further referring to the first association structure 30, an address in the memory 2 of the access target data and returns the access target data to the abnormality investigation apparatus 200. On the other hand, when the access target data is not stored (not cached) in the memory 2, the first access unit 415 of the OS accesses the storage medium 10 and acquires the data.

On the other hand, in the example depicted in FIGS. 7 and 8 in this embodiment, unlike the general file cache depicted in FIG. 9, during the reboot of the information processing apparatus 100, data is stored in the page area in the memory 2 but data is not stored in a dump file in the storage medium 10. That is, the first flags in all the page areas are in the unwritten-out state. Therefore, when the page area in the memory 2 is released, in order to prevent the data from being completely lost, the release of the page area in the memory 2 is performed after the first write-out unit 414 of the OS performs write-out to the storage medium 10 or the like (S8 and S9).

In this embodiment, when an abnormality occurs, before the reboot, the first dump file creating unit 411 of the OS only creates the first dump file 11 for writing out the data in the memory 2. The first reboot unit 412 of the OS performs the reboot without clearing the data in the memory 2. During the reboot, the first associating unit 413 of the OS sets all the first flags to the unwritten-out state and creates the first association structure 30. In the normal processing after the reboot, the first access unit 415 of the OS accesses the data stored in the page area in the memory 2 in the same manner as the control of the general file cache. When the page area in the memory 2 is released, the first write-out unit 414 of the OS writes out the data of the memory 2 to the first dump file 11. Consequently, as depicted in FIG. 5, before the reboot of the information processing apparatus 100 is performed, it becomes unneeded to write out the data stored in the page area in the memory 2 to the first dump file 11. Therefore, it is possible to reduce a downtime of the information processing apparatus 100 during the abnormality occurrence. When the reboot of the information processing apparatus 100 is completed, it is possible to access the data stored in the memory 2. Therefore, it is possible to immediately start an investigation of a cause of the occurred abnormality after the completion of the reboot of the information processing apparatus 100.

Details of the Abnormality Handling Processing in the First Embodiment

Figure 10:
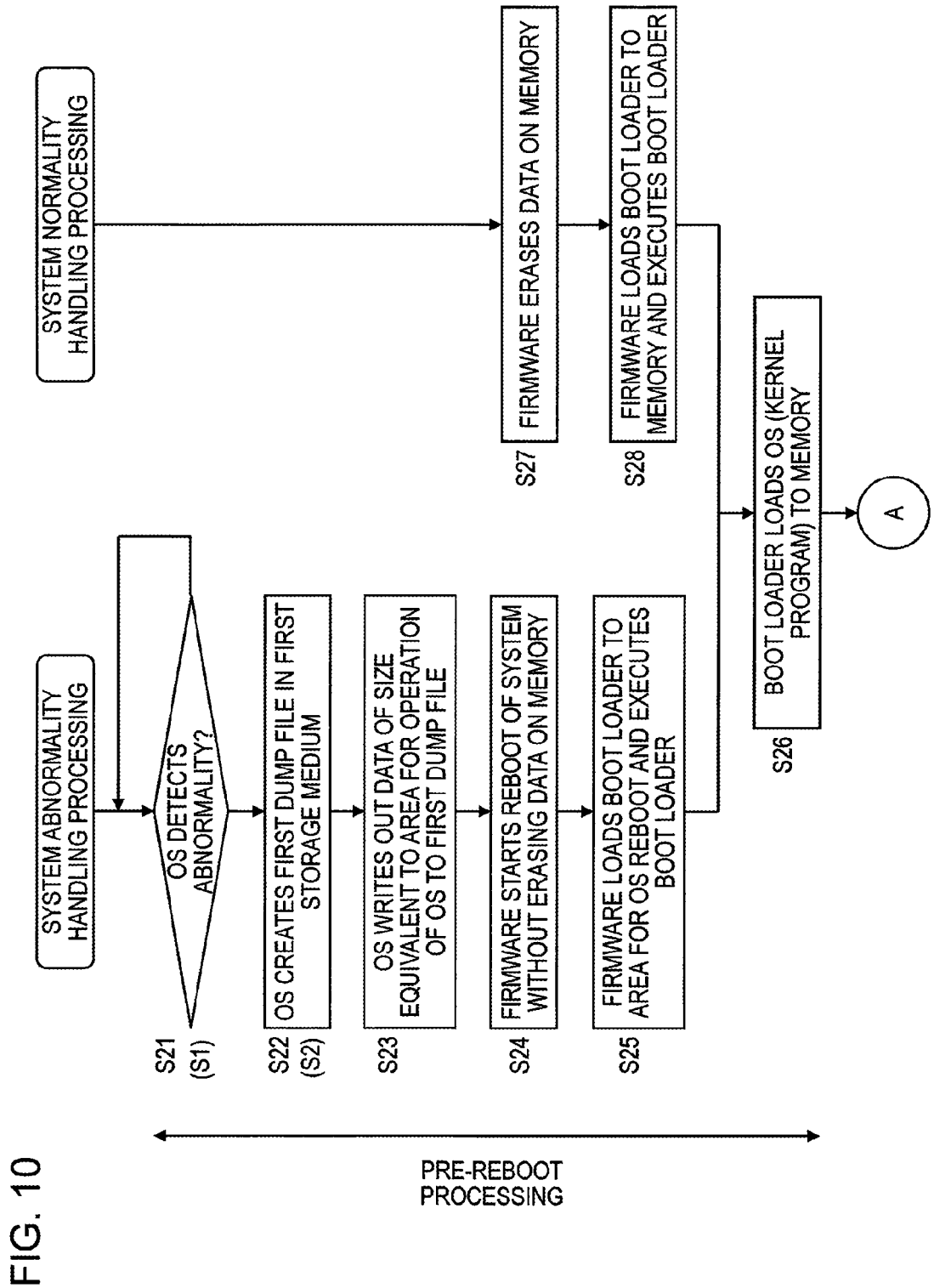
FIG. 10 is a diagram for explaining details of the abnormality handling processing and normality handling processing.
Figure 11:
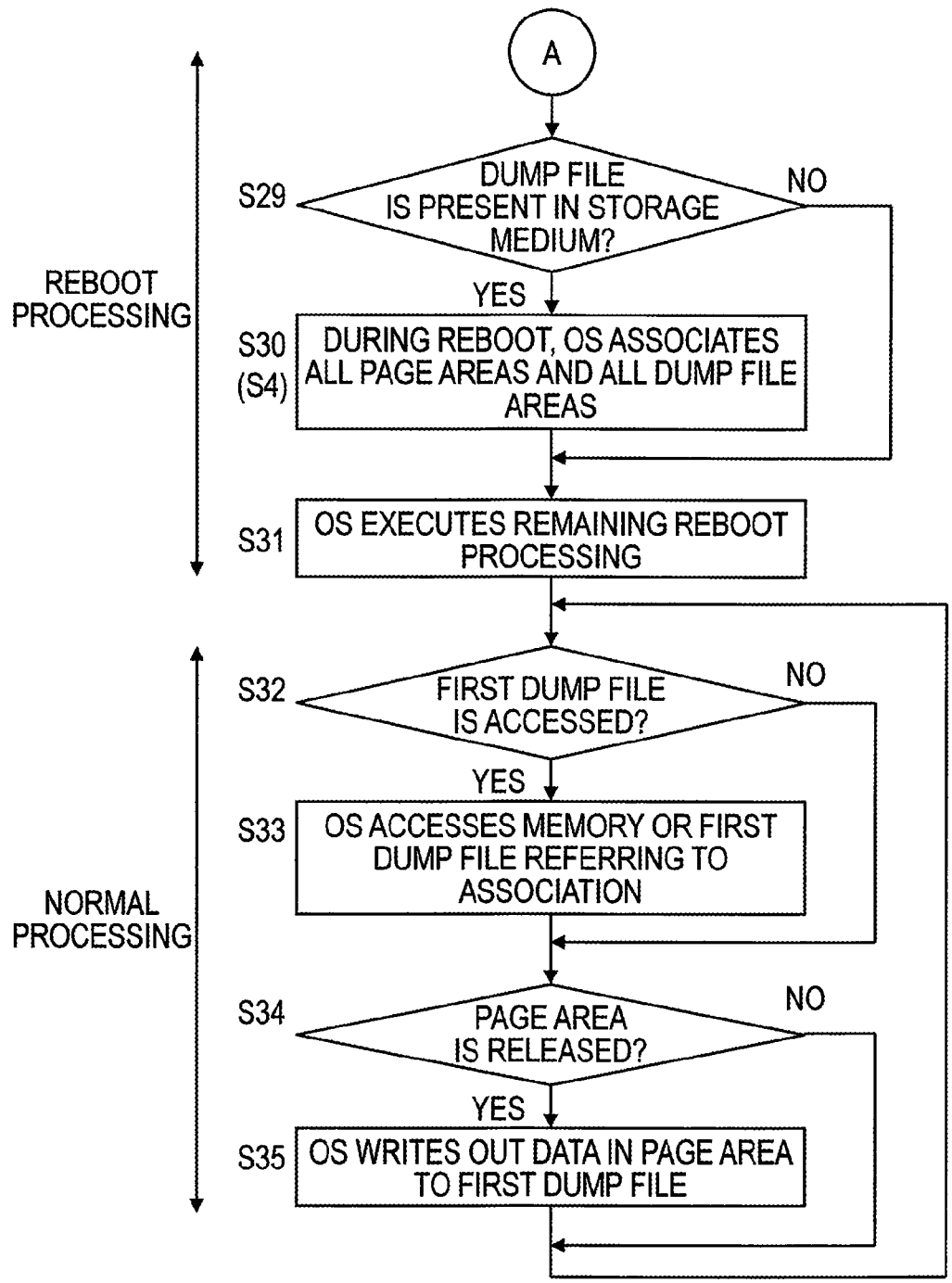
FIG. 11 is a diagram for explaining details of the abnormality handling processing and normality handling processing.

The overview of the abnormality handling processing is explained above with reference to FIG. 4. The abnormality handling processing in the first embodiment is explained more in detail below. FIGS. 10 and 11 are diagrams for explaining details of the abnormality handling processing and normality handling processing. FIGS. 12 to 16 are diagrams for explaining the details of the abnormality handling processing. The details of the abnormality handling processing and the normality handling processing depicted in FIGS. 10 and 11 are explained with reference to FIGS. 12 to 16.

[S21 and S22 in FIG. 10]

First, the abnormality detecting unit 416 of the OS detects whether an abnormality occurs in the information processing apparatus 100 (S1, S21). When the OS (the abnormality detecting unit 416) detects an abnormality in the information processing apparatus 100, the first dump file creating unit 411 of the OS creates, in the storage medium 10 (the first storage medium), the first dump file 11 for writing out the data stored in the memory 2 (S2, S22). S21 and S22 are the same as S1 and S2 explained with reference to FIG. 4. Therefore, detailed explanation of S21 and S22 is omitted.

[S23 in FIG. 10]

Subsequently, before reboot by the first reboot unit 412, the pre-reboot write-out unit 417 of the OS of the information processing apparatus 100 writes out, to the first dump file 11, data stored in a page area having a size equivalent to an area for the reboot of the OS (hereinafter also referred to as area for OS reboot) (S23). In this embodiment, the reboot is performed before the data in the memory 2 is written out to the storage medium 10 when an abnormality occurs. Therefore, during the reboot, data scheduled to be written out to the first dump file 11 is present in the memory 2. Therefore, an area in the memory 2 for loading the OS after the reboot is sometimes unable to be secured. Therefore, in S23, a minimum area needed for the reboot of the OS is secured by writing out, before the reboot of the information processing apparatus 100, to the first dump file 11, the data stored in the page area having a size equivalent to the area for the reboot of the OS.

Figure 12:
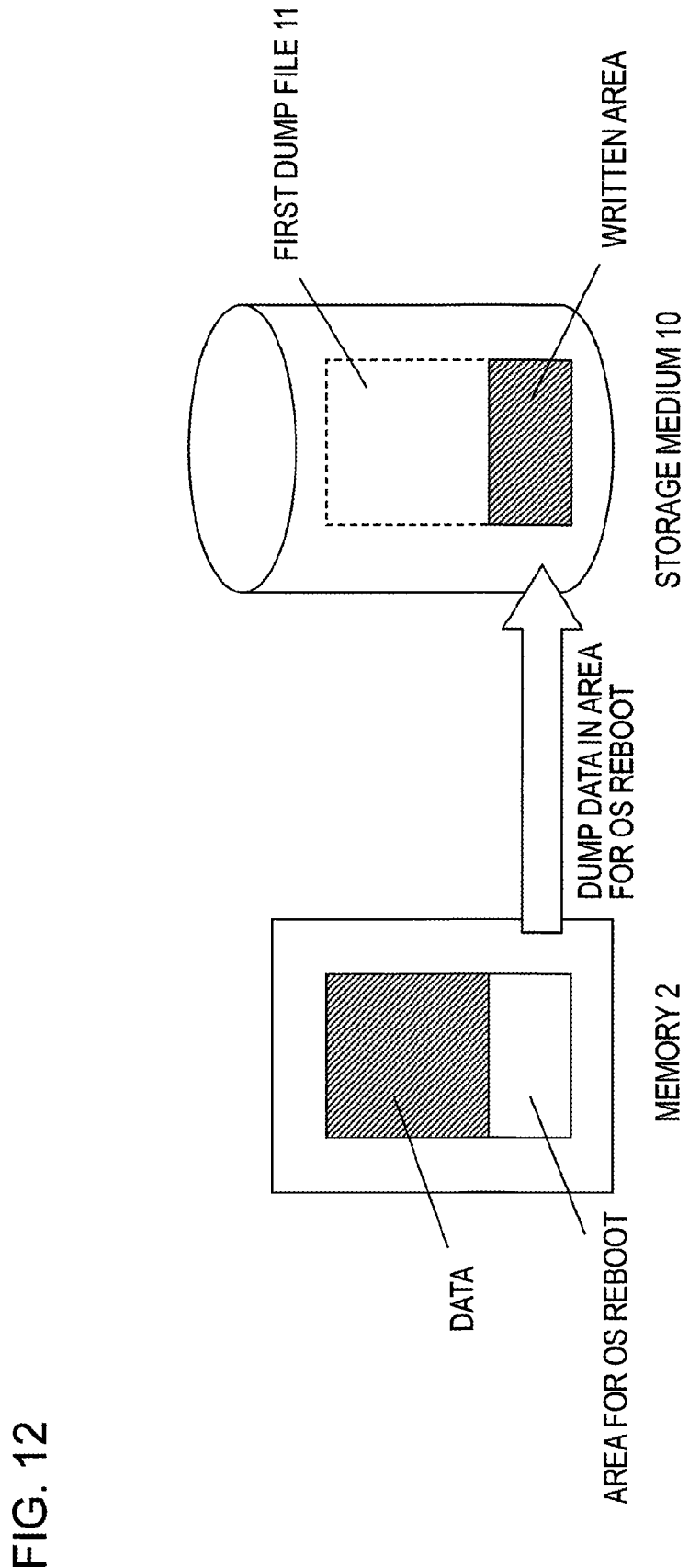
FIG. 12 is a diagram for explaining the details of the abnormality handling processing.

FIG. 12 is a diagram of a state in which the data in the area for OS reboot is written out to the first dump file 11 in the storage medium 10. Note that it is also possible that a capacity of the minimum area needed for the reboot of the OS is set in advance to a capacity (e.g., 10 GB) considered as being sufficient for performing the reboot of the OS and, irrespective of an actual capacity of the area used for the OS reboot, the pre-reboot write-out unit 417 of the OS writes out data of the capacity set in advance to the first dump file 11.

[S24 to S28 in FIG. 10]

Referring back to FIGS. 10 and 11, after the creation of the first dump file 11, the first reboot unit 412 in the firmware 3 of the information processing apparatus 100 starts the reboot of the information processing apparatus 100 without erasing the data stored in the memory 2 (S3, S24). Subsequently, the firmware 3 loads a boot loader to the area for OS reboot in the memory 2 and executes the boot loader (S25). The boot loader is stored in, for example, the program storage medium 4 depicted in FIG. 2. Further, the executed boot loader loads the OS to the area for OS reboot (S26).

Figure 13:
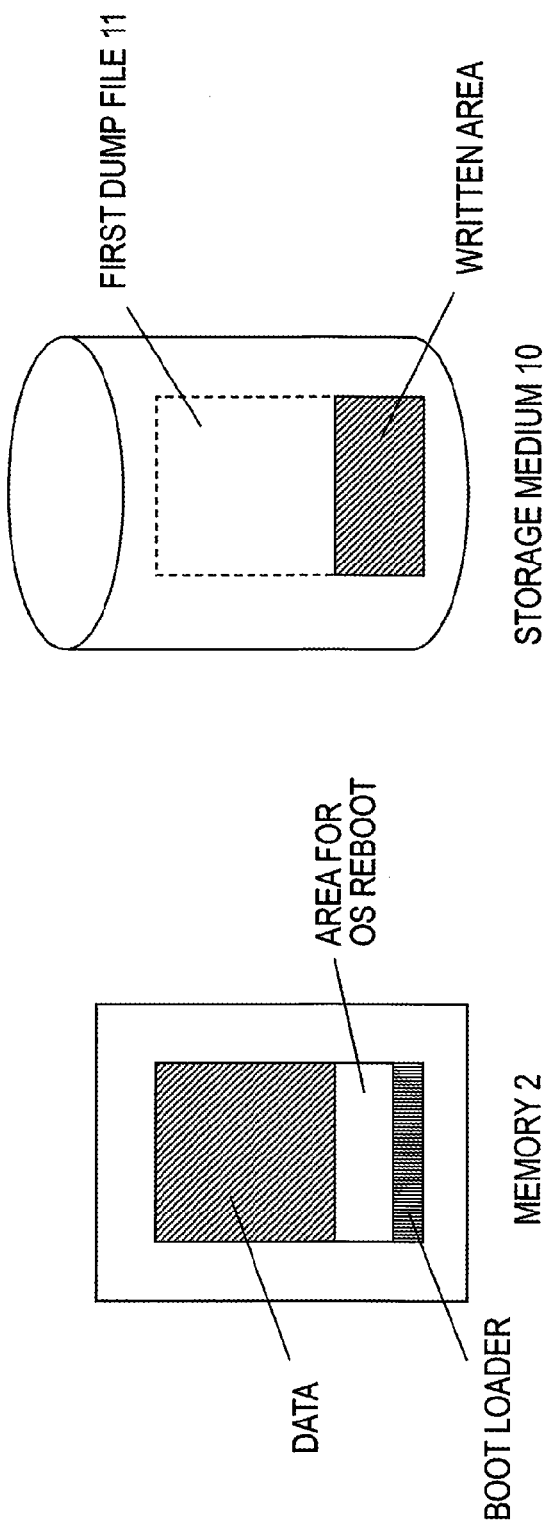
FIG. 13 is a diagram for explaining the details of the abnormality handling processing.
Figure 14:
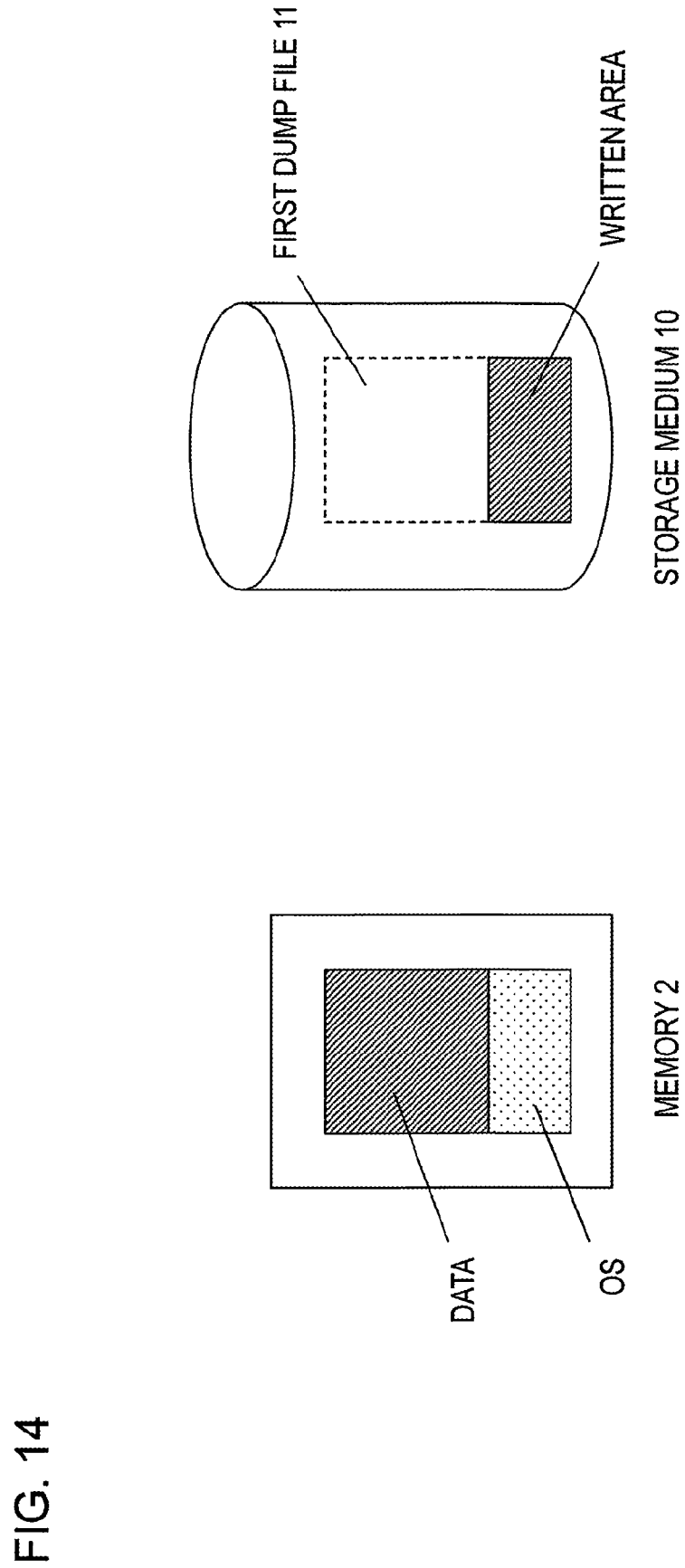
FIG. 14 is a diagram for explaining the details of the abnormality handling processing.

FIG. 13 is a diagram of a state in which the boot loader is loaded to the area for OS reboot. FIG. 14 is a diagram of a state in which the boot loader is executed in the area for OS reboot and the OS is loaded. Note that, in examples depicted in FIGS. 13 and 14, after the boot loader loads the OS (specifically, after the boot loader loads all kernel programs of the OS), the OS takes over control from the boot loader and performs the following processing.

The reboot performed when the OS detects an abnormality of the information processing apparatus 100 is explained above with reference to FIGS. 4 and 10. The reboot of the information processing apparatus 100 is sometimes executed because of, for example, implementation of maintenance even when the information processing apparatus 100 is normally operating. In the reboot of the information processing apparatus 100 during the normal time (hereinafter also referred to as normality handling processing), it is not needed to create a dump file unlike when the OS detects an abnormality of the information processing apparatus 100. That is, during the reboot of the information processing apparatus 100 at the normal time, the OS does not need to perform the detection of an abnormality (S1), the creation of a dump file (S2), and the like explained with reference to FIGS. 4 and 10. Further, in the reboot of the information processing apparatus 100 at the normal time, since it is not needed to perform the creation of a dump file, it is not needed to retain, after the reboot, the data stored in the memory 2 before the reboot. That is, it is not needed to perform the reboot of the information processing apparatus 100 without erasing the data stored in the memory 2. Therefore, as depicted in FIG. 10, in the reboot at the normal time, the firmware 3 erases the data in the memory 2 (S27) and loads the boot loader to the memory 2 and executes the boot loader (S28). The boot loader loads the OS to the memory 2 (S26) to thereby perform the reboot of the information processing apparatus 100.

Note that, before shutdown of the information processing apparatus 100 is performed, the OS causes the firmware 3 to store whether reboot to be executed is the reboot at the abnormal time. Specifically, the firmware 3 may include a flag (not depicted in the figure) indicating whether the reboot to be executed is the reboot at the abnormal time. According to the flag, the OS may cause the firmware 3 to store whether the reboot to be executed is the reboot at the abnormal time. Consequently, the firmware 3 that performs the reboot can determine whether the data stored in the memory 2 is cleared.

[S29 and S30 in FIG. 11]

Subsequently, when the dump file is present in the storage medium 10 (YES in S29), during the reboot by the first reboot unit 412, the first associating unit 413 of the OS of the information processing apparatus 100 creates an association table in which a page area where the data in the memory 2 is stored and a dump file area in the first dump file 11 to which the data is scheduled to be written out are associated with each other (S4, S30).

In the case of the reboot during the abnormality occurrence, the first dump file 11 is present in the storage medium 10 after the reboot. In the case of the reboot at the normal time, the first dump file 11 is absent in the storage medium 10 after the reboot. Therefore, by determining whether the first dump file is present in the storage medium 10 (S29), it is possible to create the association table only in the case of the abnormality occurrence (S30).

On the other hand, when the first dump file is absent in the storage medium 10 (NO in S29), the reboot at the normal time is performed. Therefore, the creation of the association table is not performed. Note that, since the creation of the association table is explained with reference to FIG. 4, detailed explanation of the creation of the association table is omitted.

Figure 15:
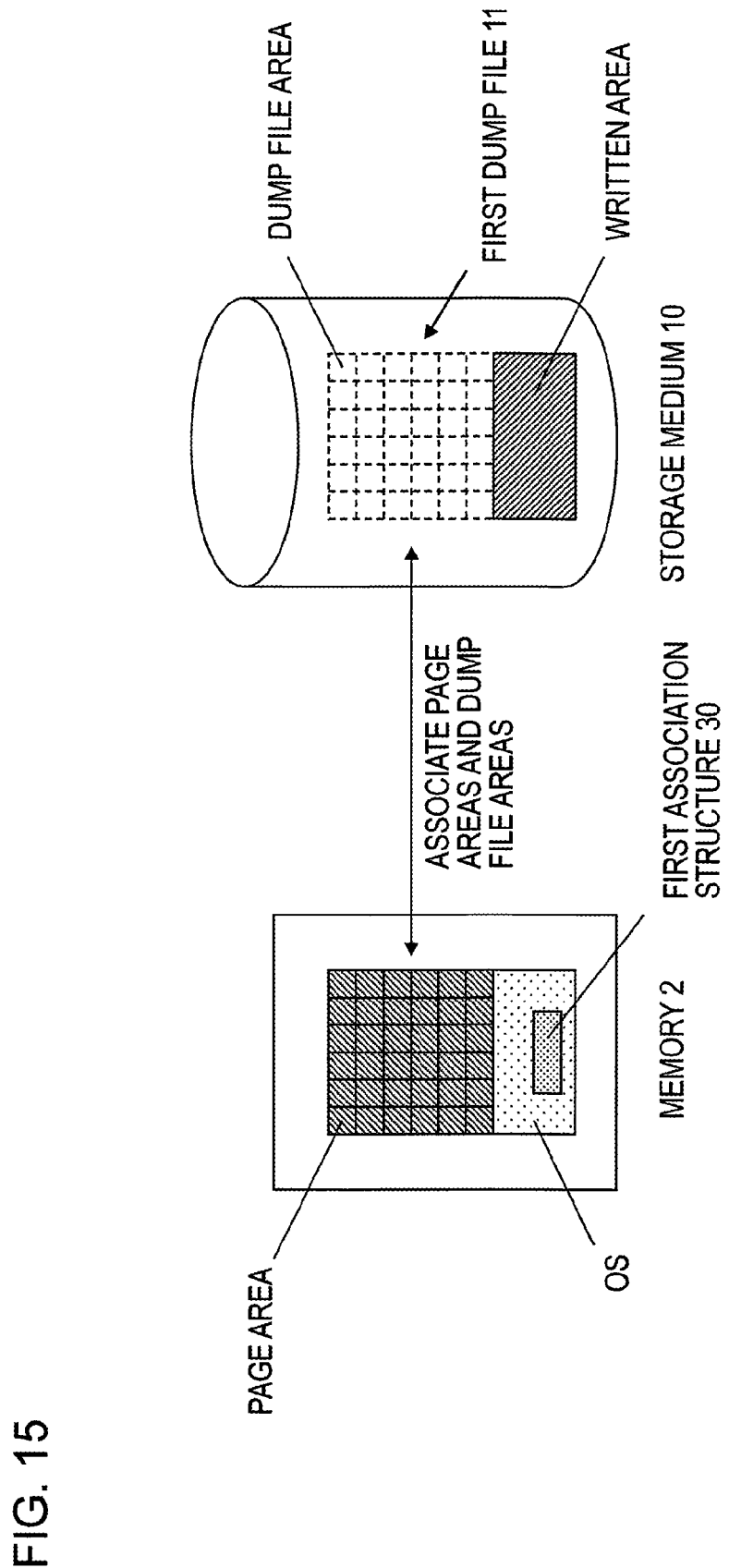
FIG. 15 is a diagram for explaining the details of the abnormality handling processing.

FIG. 15 is a diagram of a state in which the association table is created in which the page area where the data in the memory 2 is stored and the dump file area in the first dump file 11 to which the data is written out are associated with each other. In FIG. 15, an area where write-out is not performed in the memory 2 is divided into a plurality of page areas. The first dump file 11 created in S1 or S21 is divided into a plurality of dump areas. The first associating unit 413 of the OS stores the plurality of page areas and the plurality of dump files in the first association structure 30 explained with reference to FIGS. 8 and 9 while associating the plurality of page areas and the plurality of dump files with each other. Consequently, the page areas in the memory 2 and the dump file areas in the first dump file 11 to which data stored in the page areas is written out can be associated with each other. Further, the first associating unit 413 of the OS changes all the first flags to the unwritten-out state (the dirty state). Consequently, the data in the memory 2 is initialized as a file cache of the first dump file 11. As a result, when the abnormality investigation apparatus 200 accesses the first dump file 11 in the following normal operation, the OS can access, referring to the first association structure 30, the page area in the memory 2 or the dump file area in the first dump file 11 where the data is present. When releasing the data in the memory 2, the OS can write out, referring to the first association structure 30, the data in the memory 2 to be released to the dump file area in the first dump file 11 corresponding to the data. Note that, in an example depicted in FIG. 15, the first association structure 30 is stored in the OS in the memory 2.

[S32 to S35 in FIG. 11]

Referring back to FIGS. 10 and 11, when the first dump file 11 is accessed (YES in S32), the first access unit 415 of the OS of the information processing apparatus 100 accesses the memory 2 or the first dump file 11 referring to the first association structure 30 (S33). Further, when the page area in the memory 2 is released (YES in S34), if the first flag of the first association structure 30 is in the unwritten-out state, the first write-out unit 414 of the OS of the information processing apparatus 100 writes out the data stored in the page area to the first dump file 11 (S35).

Figure 16:
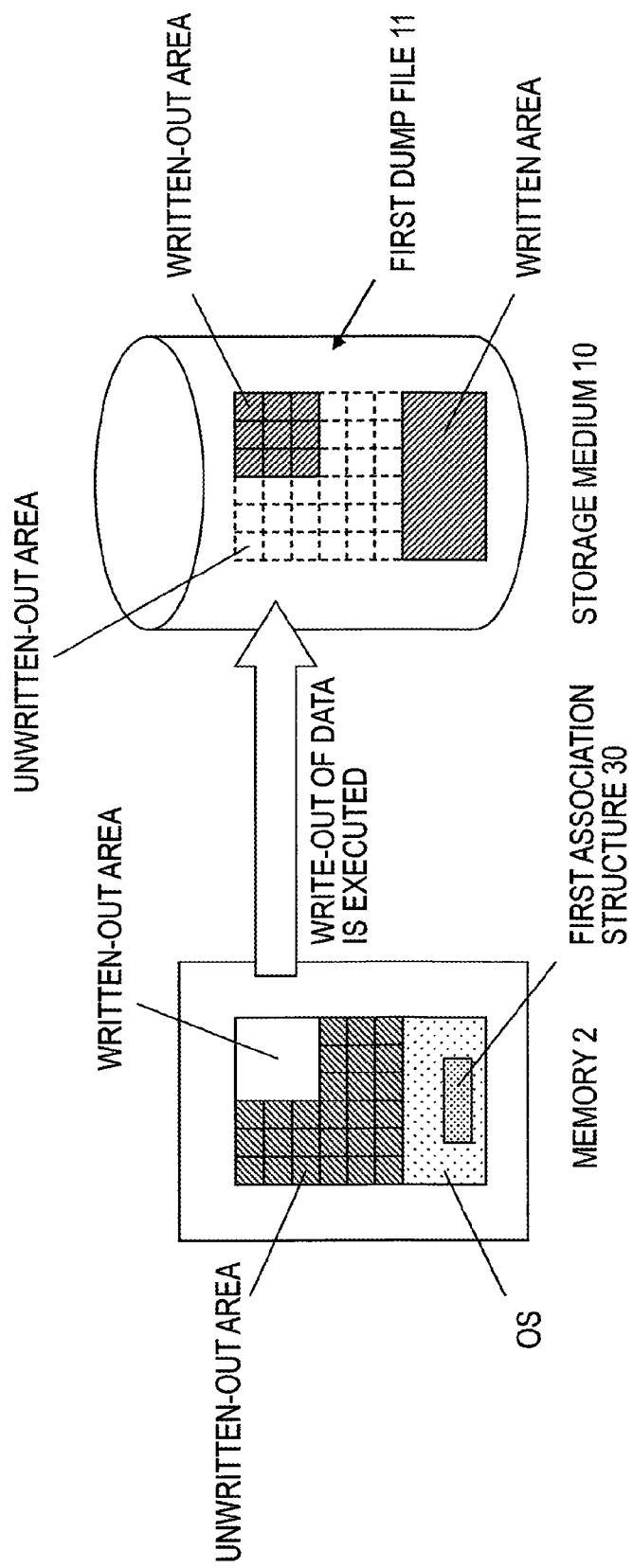
FIG. 16 is a diagram for explaining the details of the abnormality handling processing.

FIG. 16 is a diagram of a state in which a part of the data stored in the page area is written out to a dump address area in the first dump file 11. As explained with reference to FIG. 9, when the page area in the memory 2 is released, the OS performs write-out to the dump file area in the first dump file 11 referring to the first flag and the association table of the first association structure 30.

[Details of the Association Processing]

Figure 17:
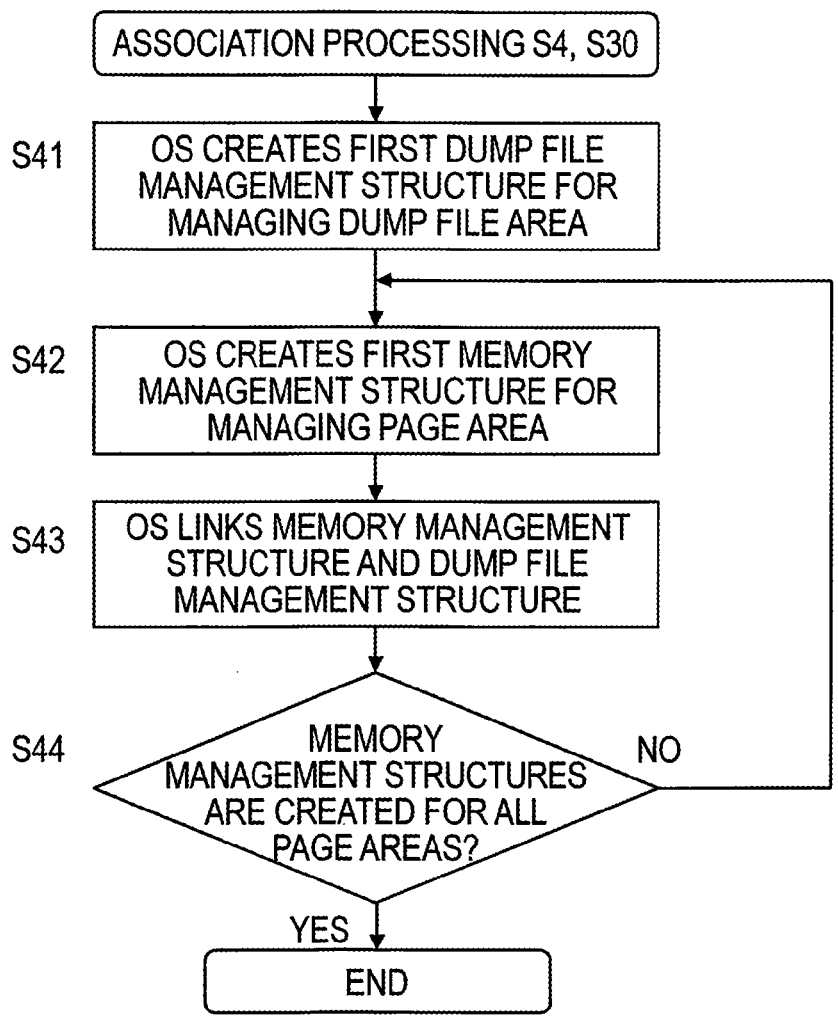
FIG. 17 is a flowchart for explaining details of the association processing S4, S30.

FIG. 17 is a flowchart for explaining details of the association processing S4, S30. FIGS. 18 to 21 are diagrams for explaining the association processing S4, S30. Details of the association processing S4, S30 in FIG. 17 are explained with reference to FIGS. 18 to 21. In the association processing S30, the first association structure 30 for associating the plurality of pages and the plurality of dump files with each other is created. The first association structure 30 is created when the first dump file 11 is created before the reboot is performed during the abnormality occurrence. The first association structure 30 includes a first dump file management structure 31 for managing address information and the like of the first dump file 11 and a plurality of first memory management structures 32 for respectively associating, with each other, address information of dump file areas in the first dump file 11 and page areas in the memory 2 where data scheduled to be written out to the dump file areas is stored.

Figure 18:
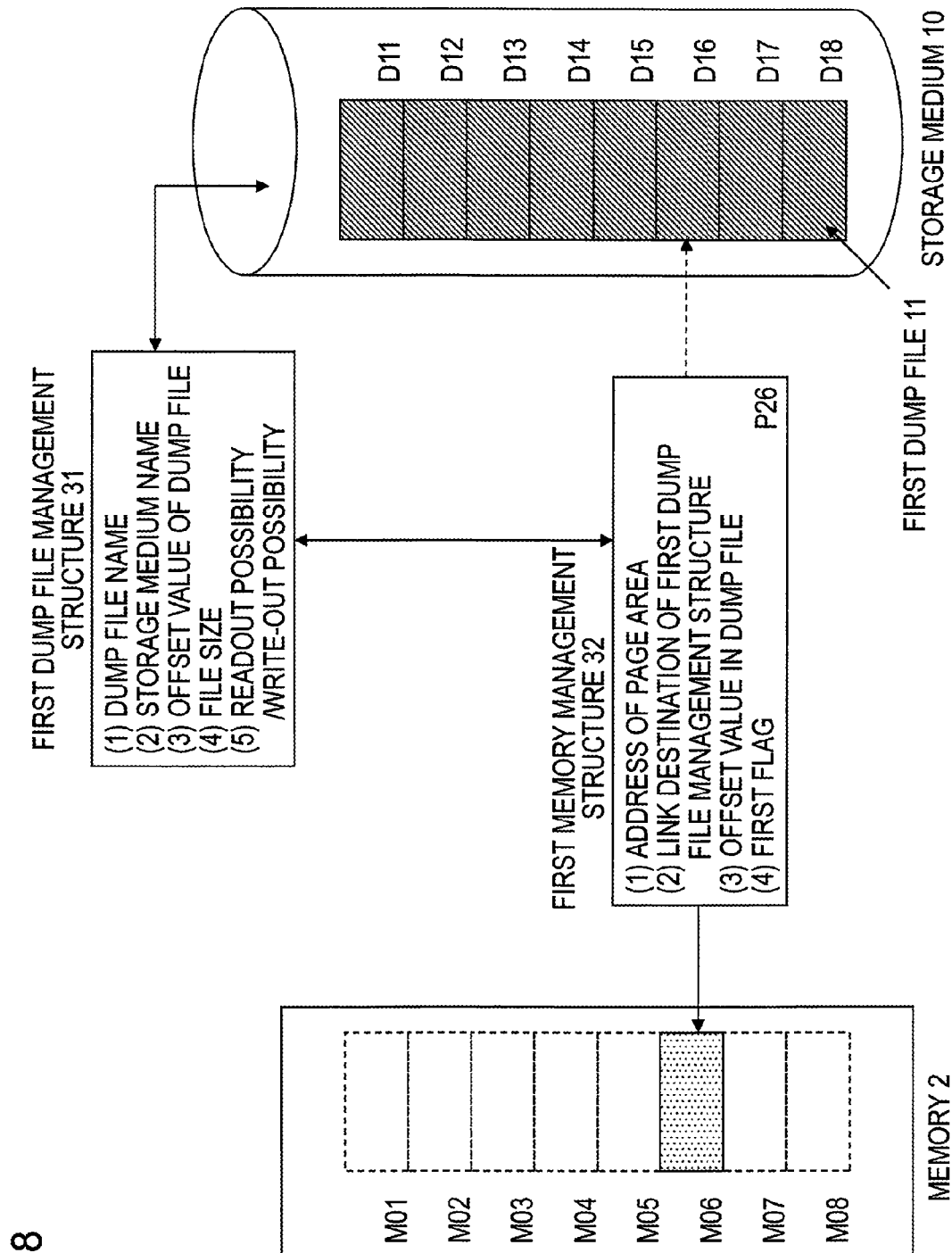
FIG. 18 is a diagram for explaining details of the association processing S4, S30.

FIG. 18 is a diagram for explaining the first dump file management structure and the first memory management structure. In an example depicted in FIG. 18, the memory 2 includes eight page areas M01 to M08. The dump file areas in the first dump file 11 in the storage medium 10 include eight page areas D11 to D18. The first dump file management structure 31 is a structure for managing information of the first dump file 11. The first memory management structure 32 is a structure for managing a pages area in the memory 2 and a dump file area in the first dump file 11 to which data stored in the page area is scheduled to be written out in association with each other.

In this embodiment, the first dump file management structure 31 is created for each dump file. The first memory management structure 32 is created for each combination of one page area and one dump file area. Therefore, in the example depicted in FIG. 18, there is only one dump file (the first dump file 11) and the eight page areas and the eight dump file areas are present. Therefore, one first dump file management structure 31 is created at the maximum. Eight first memory management structures 32 are created at the maximum.

In the example depicted in FIG. 18, data are respectively stored in the dump file areas D11 to D18. Data is stored only in the page area M06 in the memory 2. In the first memory management structure 32, only a first memory management structure P26 for managing the page area M06 and the dump file area D16 in association with each other is present.

Information included in the dump management structure and the memory management structure is explained. The first dump file management structure 31 depicted in FIG. 18 is created for each dump file and includes information for specifying the dump file. Specifically, the first dump file management structure 31 includes, for example, (1) a name of the dump file, (2) a name of a storage medium (e.g., a HDD) in which the dump file is stored, (3) an offset value of a first area where the dump file is stored in the storage medium, (4) a size of the dump file, and (5) attribute information of the dump file concerning readout possibility and write-out possibility. Therefore, it is possible to specify, according to the name of the storage medium, the storage medium in which the dump file is stored. It is possible to specify, according to the offset value of the first area where the dump file is stored in the storage medium and the size of the dump file, an area where the dump file is stored in the storage medium.

The first memory management structure 32 depicted in FIG. 18 is created for each combination of one page area and one dump file area. To enable access to the page area and the dump file managed by the first memory management structure 32, the first memory management structure 32 includes information capable of specifying the respective areas. Specifically, the first memory management structure 32 includes (1) an address of the page area in the memory, (2) link information to the first dump file management structure 31 for managing the dump file area corresponding to the managed page area, (3) an offset value in the first dump file 11, and (4) information concerning the first flag indicating whether data stored in the page area is written out to the dump file area corresponding thereto (in the dirty state). Therefore, it is possible to access the managed page area according to the address of the page area. It is possible to specify, according to the link information to the first dump file management structure 31 and the offset value in the dump file, a dump file in which the dump file area corresponding to the page area is stored and access the dump file area in the dump file.

Since the first memory management structure 32 includes the first flag, when the data stored in the page area is released, the OS can determine whether it is needed to perform write-out to the dump file area corresponding to the page area. For example, when the first memory management structure 32 is created, the OS sets the first flag indicating that the data stored in the page area is not stored in the dump file area corresponding to the page area. When the OS releases the page area, the OS can perform control to release the page area after the data in the page area is written out to the dump file. As explained in detail below with reference to FIG. 22, the OS deletes the first memory management structure 32 when the page area in the memory is released. Consequently, it is possible to determine, according to presence or absence of the first memory management structure 32, whether data is stored in the page area in the memory and whether the data is already written out to the first dump file 11.

Figure 19:
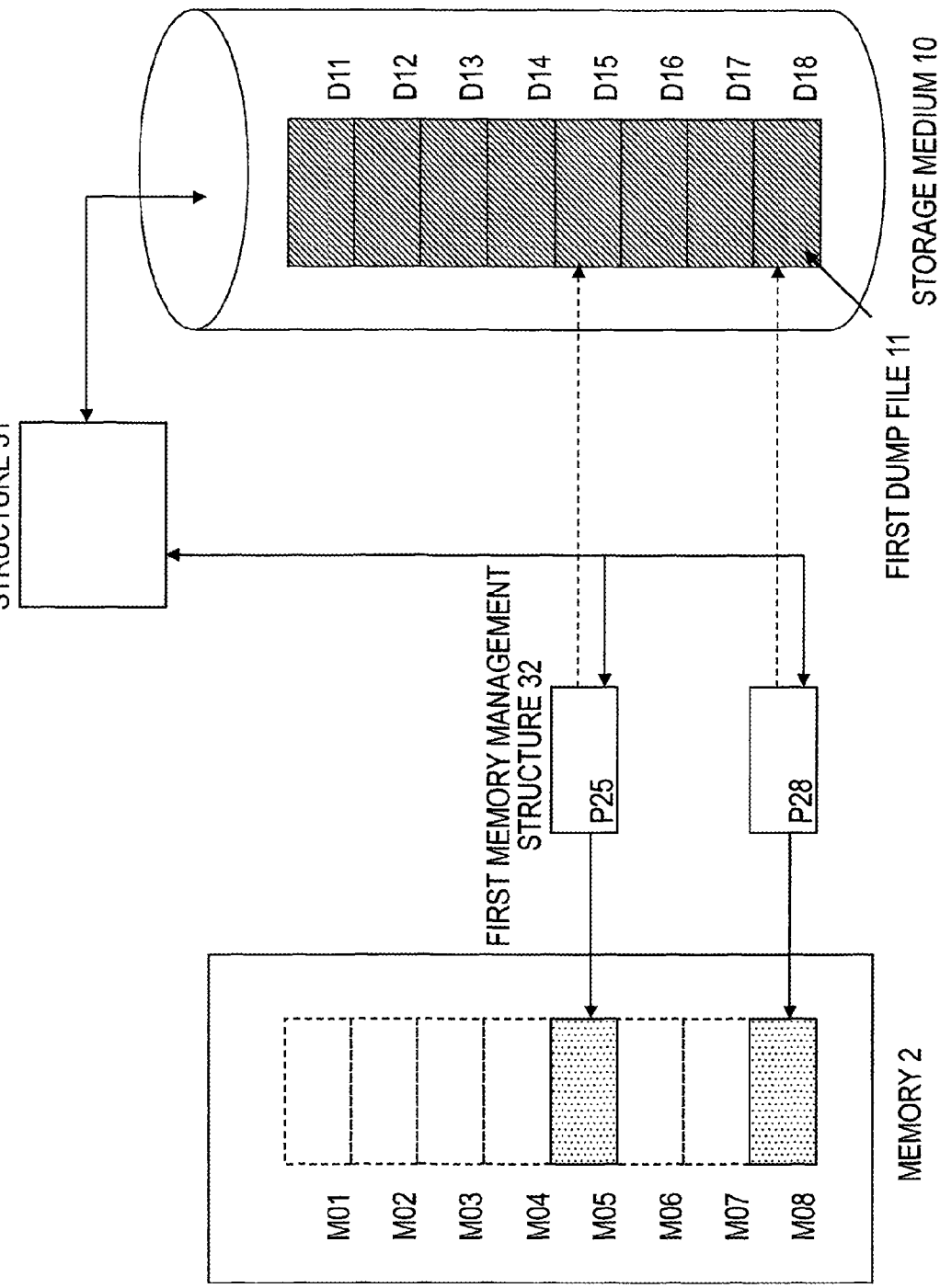
FIG. 19 is a diagram for explaining details of the association processing S4, S30.

FIG. 19 is a diagram for explaining the first dump file management structure and the first memory management structure. In an example depicted in FIG. 19, data is stored in the memory dump areas D15 and D18 corresponding to the page areas M05 and M8. Therefore, first memory management structures P25 and P28 are present. First flags respectively included in the first memory management structures P25 and P28 indicate whether data stored in the page areas are stored in the dump file areas corresponding to the page areas.

[S41 in FIG. 17]

When creating the first dump file 11 before the reboot during the abnormality occurrence, the first associating unit 413 of the OS creates the first dump file management structure 31 for managing the dump file areas in the first dump file 11 (S41).

Figure 20:
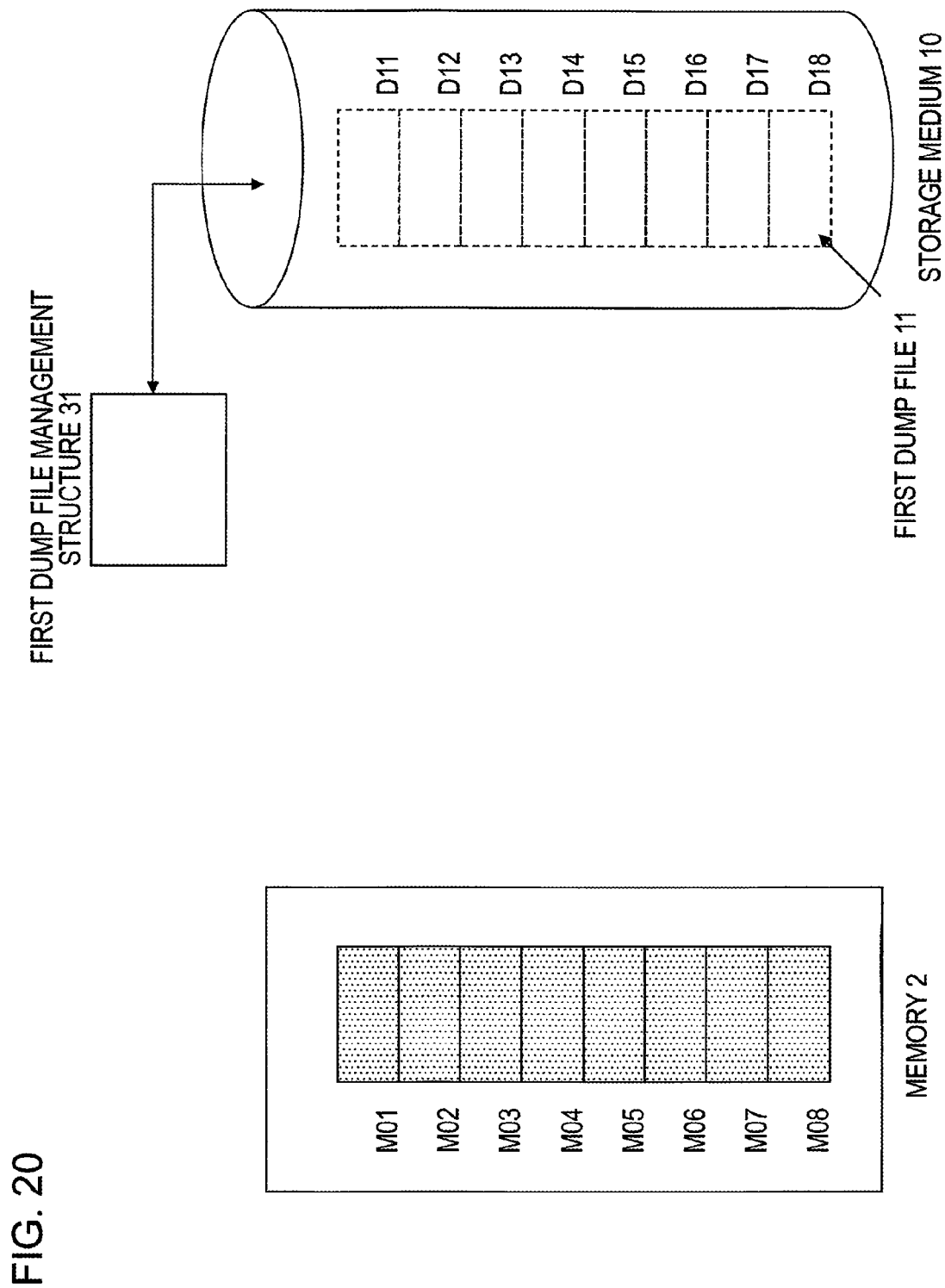
FIG. 20 is a diagram for explaining details of the association processing S4, S30.

FIG. 20 is a diagram of a state in which the first dump file management structure 31 is created. As depicted in FIG. 20, during the reboot of the information processing apparatus 100 after the abnormality occurrence, data in all of the page areas M01 to M08 are not written out to the first dump file 11 yet and data is not stored in the dump file areas D11 to D18. When creating the first dump file 11, the OS creates the first dump file management structure 31 for managing information of the first dump file 11. Note that, in examples depicted in FIGS. 17 and 20, the first dump file management structure 31 is created by the first associating unit 413. However, in S2 in which the first dump file 11 is created, the first dump file creating unit 411 of the OS may create the first dump file management structure 31.

[S42 to S44 in FIG. 17]

Subsequently, the first associating unit 413 of the information processing apparatus 100 creates the first memory management structure 32 for managing the page areas (S42)

and links the first memory management structure 32 and the first dump file management structure 31 (S43). The first associating unit 413 repeats S42 and S43 until the first memory management structure 32 is created for all the page areas (S44). Note that, in FIG. 17, the creation of the first memory management structure 32 and the creation of the link to the first dump file management structure 31 are alternately performed. However, the respective kinds of processing may be collectively performed a plurality of times.

Figure 21:
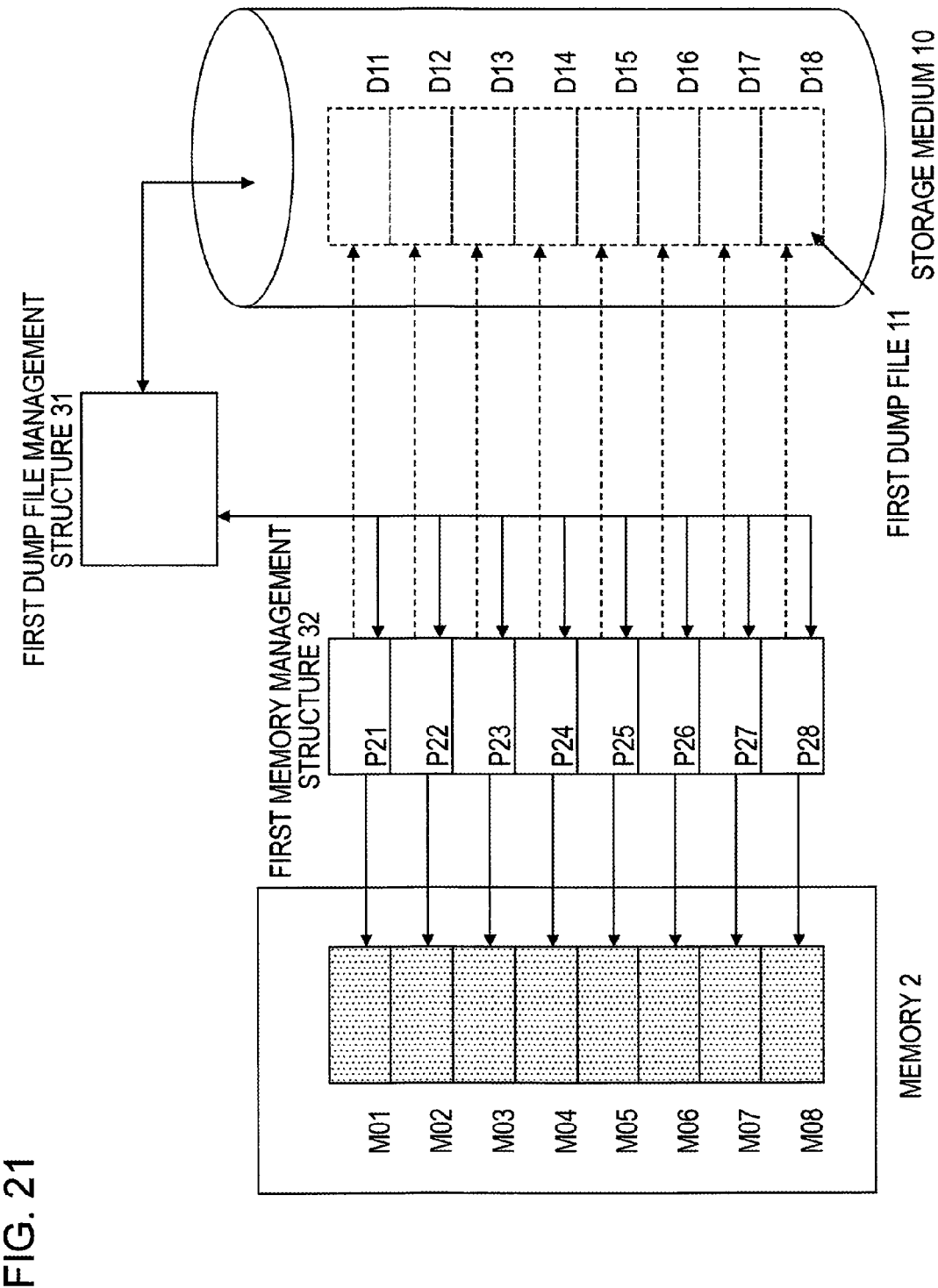
FIG. 21 is a diagram for explaining details of the association processing S4, S30.

FIG. 21 is a diagram of a state in which the first memory management structure 32 is created and the link to the first dump file management structure 31 is created. During the reboot of the information processing apparatus 100 after the abnormality occurrence, the data in all of the page areas M01 to M8 is not written out to the first dump file 11 yet and data is not stored in the dump file areas D11 to D18. Therefore, as explained with reference to FIG. 19, the first memory management structures P21 to P28 are respectively provided for all of the page areas M01 to M08. Further, since data is not stored in the dump file areas D11 to D18, the first flags included in the respective memory management structures P21 to P28 indicate that data stored in the page areas is not written out and are inconsistent with data in the dump file areas corresponding to the page areas.

[Details of the Write-Out Processing]

Figure 22:
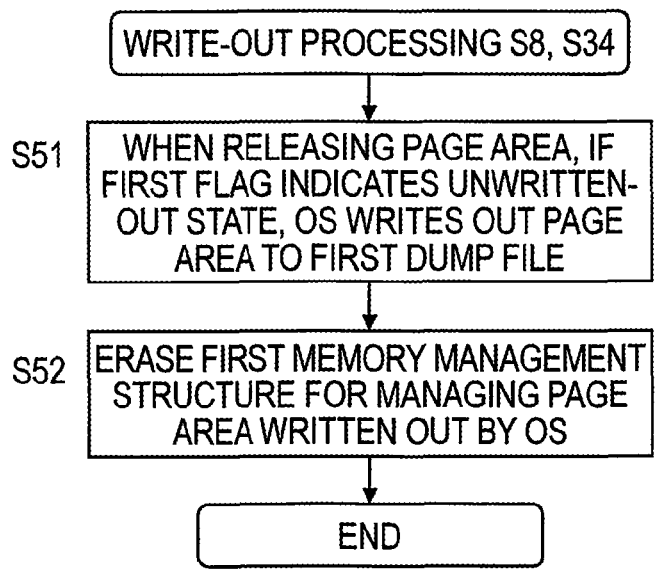
FIG. 22 is a flowchart for explaining details of the write-out processing S9, S35.
Figure 23:
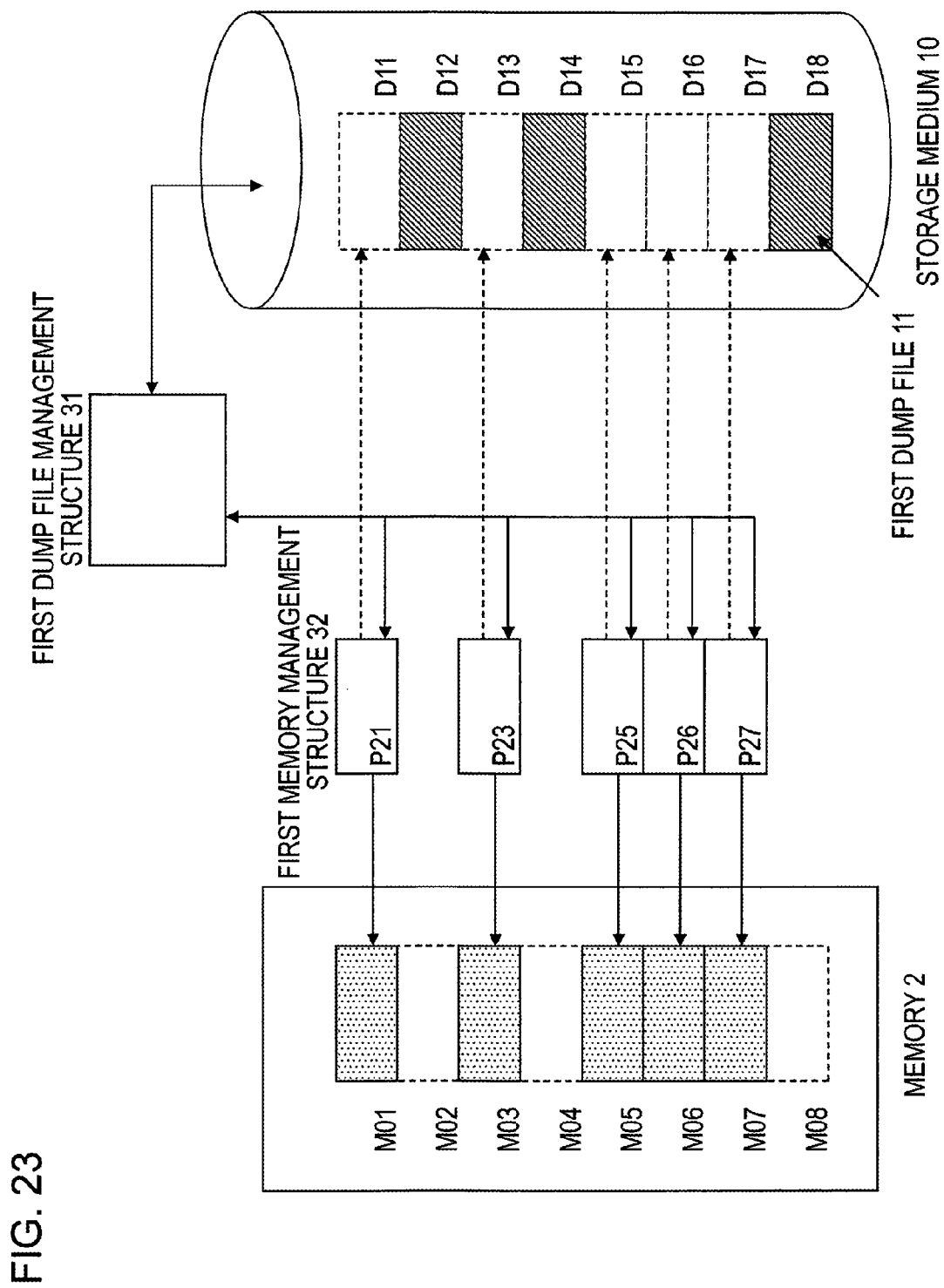
FIG. 23 is a diagram for explaining details of the write-out processing S35.

FIG. 22 is a flowchart for explaining details of the write-out processing S9, S35. FIG. 23 is a diagram for explaining the write-out processing S35. FIG. 23 is a diagram for explaining the write-out processing S9, S35. Details of the write-out processing S9, S35 in FIG. 22 are explained with reference to FIG. 23. As explained with reference to FIG. 4, when releasing a page area, if the first flag is in the unwritten-out state (the dirty state), the first write-out unit 414 of the OS writes out the page area to the first dump file 11 (S51). Subsequently, the first write-out unit 414 of the information processing apparatus 100 erases the first memory management structure 32 for managing the page area written out in S51 (S52).

FIG. 23 is a diagram depicting a state in which the page areas M02, M04, and M08 are released from the state depicted in FIG. 21. In FIG. 23, when data in the page areas M02, M04, and M08 is released, write-out to the dump file areas D12, D14, and D18 is performed (S51). When data in a page area is written out to a dump file area, the OS erases the first memory management structure 32 for managing information of the page area. Therefore, in FIG. 23, the first memory management structures P22, P24, and P28 corresponding to the memory areas M02, M04, and M08, for which the write-out to the dump file areas is completed, are erased (S52). Consequently, the first access unit 415 of the OS can specify, simply by referring to the first memory management structure, which of the page area and the dump file area is accessed in response to an access request to data in the first dump file 11.

Specifically, processing performed when the access processing S7, S33 to the first dump file 11 occurs in the state of FIG. 23 is explained. The first access unit 415 of the OS refers to the first memory management structure 32 for managing a page area where the access target data is stored. When the first memory management structure 32 is present (e.g., the memory management structure P21), the access target data is stored in a page area (the page area M01) in the memory. Therefore, it is possible to access to the page area referring to an address of the page area stored in the first memory management structure 32. On the other hand, when the first memory management structure 32 for managing a page area where the access target data is stored is absent (e.g., the memory management structure P22), the access target data is not stored in a page area (the page area M02) in the memory and is stored in a dump file area (the dump file area D12). Therefore, it is possible to access the dump file area referring to an address of the dump file area stored in the first memory management structure 32. Note that, irrespective of whether the data stored in the page area is also stored in the dump file area, by determining whether the first memory management structure 32 for managing a page area where the access target data is stored is present, it is possible to determine which of the page area and the dump file area is accessed.

Second Embodiment

Figure 24:
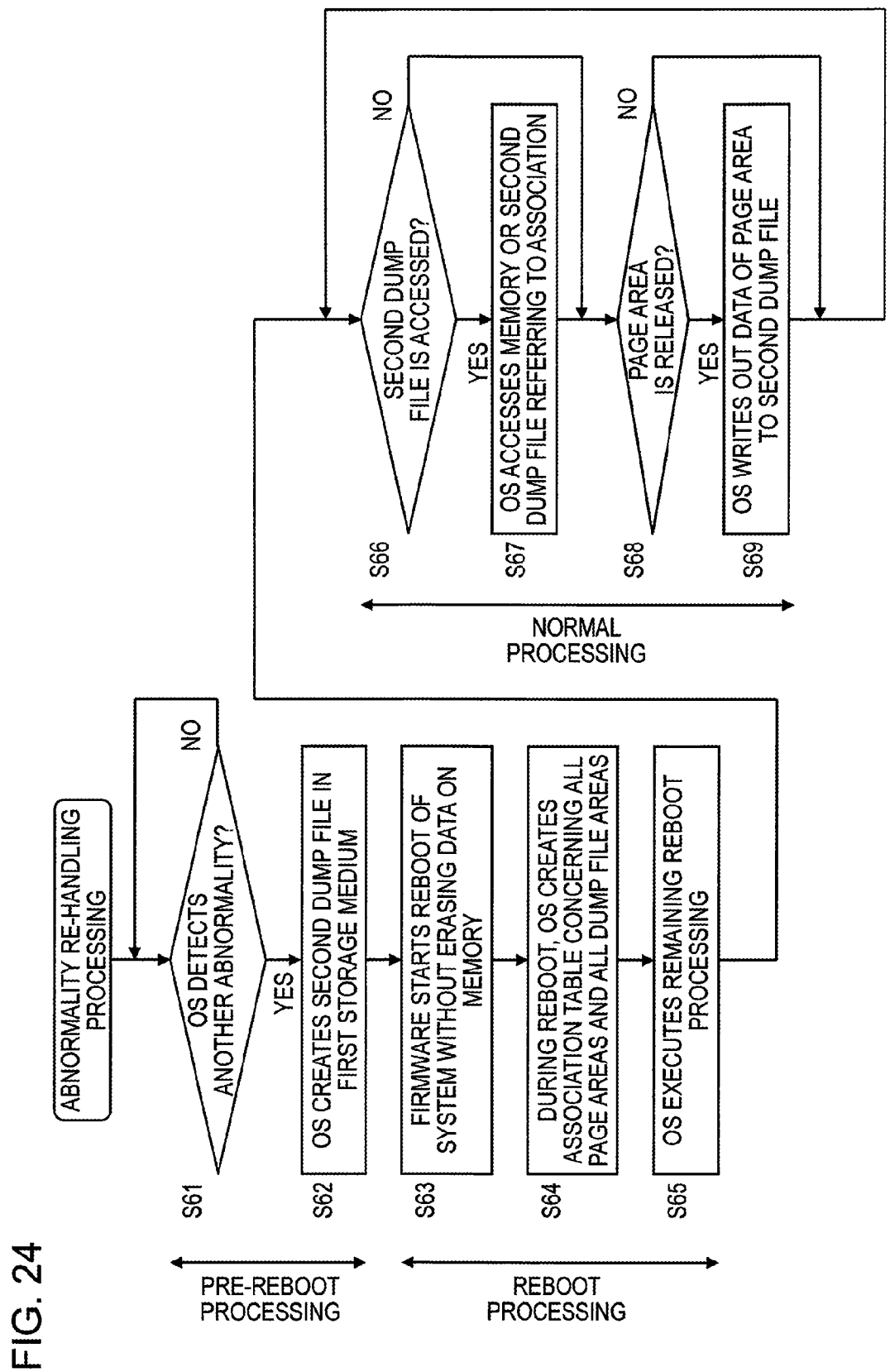
FIG. 24 is a flowchart for explaining abnormality re-handling processing.
Figure 25:
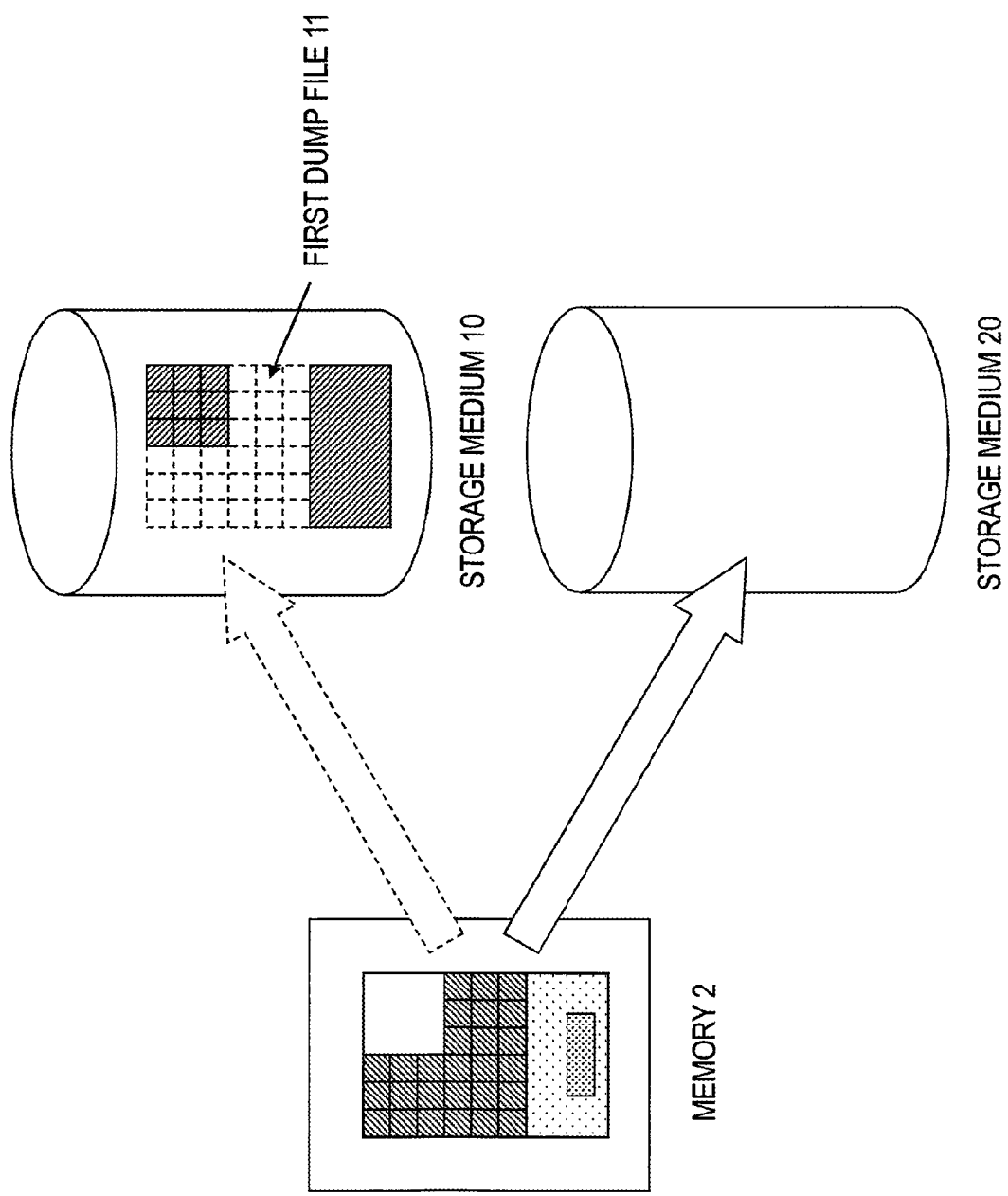
FIG. 25 is a diagram for explaining the abnormality re-handling processing.
Figure 26:
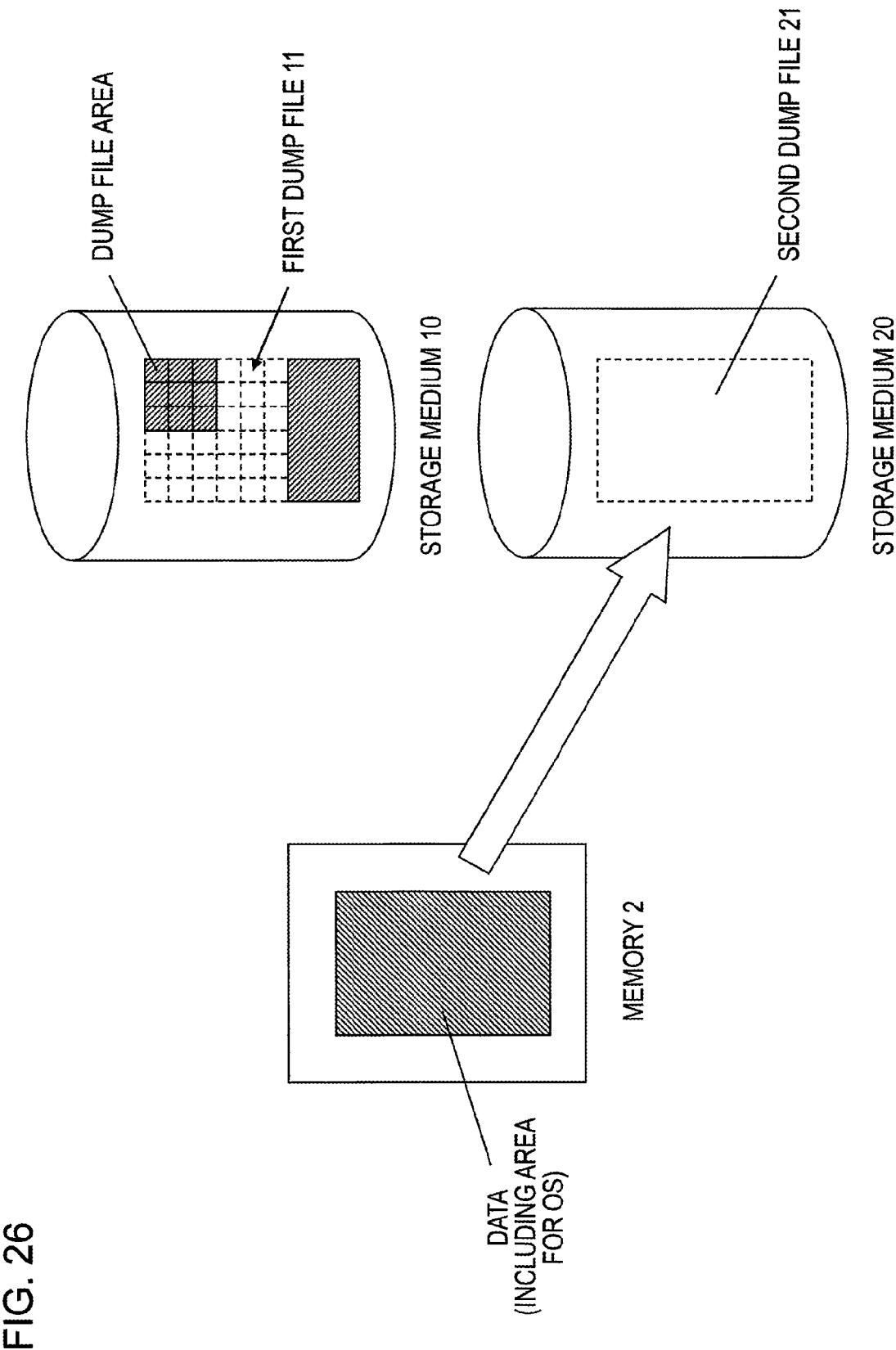
FIG. 26 is a diagram for explaining the abnormality re-handling processing.
Figure 27:
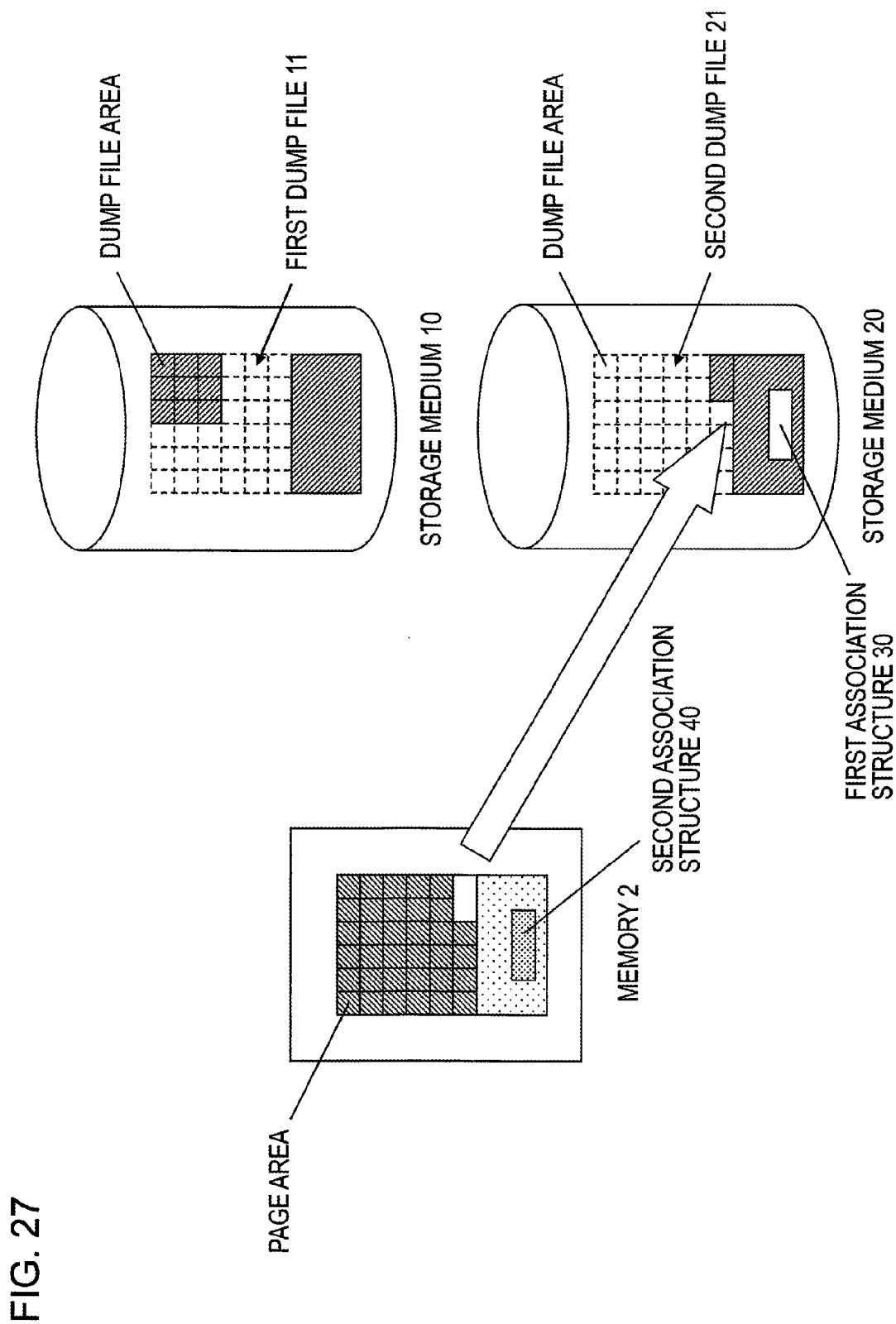
FIG. 27 is a diagram for explaining the abnormality re-handling processing.

FIG. 24 is a flowchart for explaining abnormality re-handling processing. FIGS. 25 to 27 are diagrams for explaining the abnormality re-handling processing. The abnormality re-handling processing in FIG. 24 is explained with reference to FIGS. 25 to 27. In the abnormality handling processing in the first embodiment explained with reference to FIG. 4, after the reboot of the information processing apparatus 100 is completed, the write-out to the first dump file 11 is performed by the first write-out unit 414. As explained with reference to FIG. 9, the write-out to the first dump file 11 is performed when a page area in the memory 2 is released. It is likely that a long time is consumed until write-out of data stored in all page areas is completed. Therefore, in some cases, the OS detects another abnormality and the reboot of the information processing apparatus 100 occurs by the time the write-out of the data stored in all the page areas is completed. The abnormality re-handling processing is executed in such a case. Specifically, the OS executes the abnormality re-handling processing in any one of S6 to S9 in FIG. 4 or in any one of S32 to S35 in FIG. 11.

In the abnormality re-handling processing, data stored in a page area in the memory 2 is written out to a second dump file 21 different from the first dump file 11. That is, the write-out to the first dump file 11 performed to that point is suspended and data in the memory 2 at the time when another abnormality occurs is written out to the second dump file 21 different from the first dump file 11. Note that the abnormality re-handling processing is executed when the OS detects another abnormality in any one of S6 to S9 explained with reference to FIG. 4 or any one of S32 to S35 explained with reference to FIGS. 10 and 11. Details of the abnormality re-handling processing are explained below.

[S61 in FIG. 24]

First, the abnormality detecting unit 416 of the OS detects occurrence of an abnormality in the information processing apparatus 100 (S61). Note that S61 is the same as S1 explained with reference to FIG. 4. Therefore, explanation of S61 is omitted.

FIG. 25 is a diagram of a state in which the write-out to the first dump file 11 is suspended. As depicted in FIG. 25, when the abnormality detecting unit 416 of the OS detects another abnormality different from the abnormality that is the cause of the execution of the abnormality handling processing, the abnormality detecting unit 416 suspends the write-out to the first dump file 11 and starts processing for write-out to the second dump file 21. Therefore, the first dump file 11, to which the write-out is suspended, maintains a state at the time of the suspension of the write-out without being overwritten.

[S2 and S4 in FIG. 4 and S22 and S30 in FIGS. 10 and 11]

Processing that needs to be performed in the abnormality handling processing in order to execute the abnormality re-handling processing is explained. When a second association structure 40 explained in S64 is created, a plurality of dump files are sometimes present in a storage medium. Therefore, the second associating unit 423 of the OS explained in S64 needs to determine for which dump file the second association structure 40 is created. Specifically, the abnormality handling processing unit performs processing explained below in that processing.

In S2 in FIG. 4 and S22 in FIG. 10 for creating the first dump file 11, the second associating unit 423 writes, for example, "0x00" in a lead byte of the created first dump file 11. Further, in S4 in FIG. 4 and S30 in FIG. 11 for creating the first association structure 30, the second associating unit 423 checks whether "0x00" is written in a lead byte of a dump file present in the storage medium and creates the first association structure 30 for the dump file in which "0x00" is written. After creating the first association structure 30, the second associating unit 423 writes "0xff" in a lead type of a dump file (the first dump file 11) corresponding to the dump file and associates the dump files. Consequently, when the second association structure 40 explained in S64 is created, it is possible to prevent a new association structure from being created for the first dump file 11 for which the first association structure 30 is already created.

[S62 and S63 in FIG. 24]

Referring back to FIG. 24, the second dump file creating unit 421 of the OS creates, in the storage medium 20 (the second storage medium), the second dump file 21 for writing out data stored in a page area in the memory 2 (S62). The second dump file creating unit 421 of the OS writes "0x00" in a lead byte of the created second dump file 21. Subsequently, the second reboot unit 422 started by the firmware 3 of the information processing apparatus 100 reboots the information processing apparatus 100 without erasing data stored in the memory 2 (S63). Note that, in S62 and S63, dump files at write-out destinations are different. However, contents of the processing are the same as S2 and S3 explained with reference to FIG. 4. Therefore, explanation of the contents of the processing is omitted. The storage medium 10 and the storage medium 20 may be the same storage medium.

FIG. 26 is a diagram of a state in which the second dump file 21 is created in the storage medium 20. As depicted in FIG. 26, when the OS detects another abnormality different from the abnormality that causes the execution of the abnormality handling processing, irrespective of a progress of write-out to the first dump file 11, the abnormality detecting unit 416 of the OS needs to make it possible to access, after reboot, data in the memory 2 during the occurrence of the other abnormality. Therefore, when the OS detects another abnormality different from the abnormality that causes the execution of the abnormality handling processing, the second dump-file creating unit 421 creates the second dump file 21.

[S64 to S69 in FIG. 24]

Referring back to FIG. 24, the second associating unit 423 of the OS creates, during the reboot of the information processing apparatus 100, an association table of a page area where data is stored in the memory 2 and a dump area in the second dump file 21 to which the data is written out (S64). The creation of the association table is performed for the second dump file 21, the lead byte of which is "0x00". The lead type of the first dump file 11 in the associated state (a state in which the first association structure 30 is created) is "0xff". Therefore, the creation of the association table is not performed for the first dump file 11.

Further, the OS executes the remaining reboot processing and completes the reboot of the information processing apparatus 100 (S65).

Subsequently, when the second dump file 21 is accessed in the normal operation after the reboot (YES in S66), the second access unit 425 of the OS accesses the memory 2 or the second dump file 21 referring to the second association structure 40 (also referred to as second table 40) (S67). Note that, like the first association structure 30, the second association structure 40 associates a page area where data is stored in the memory 2 and a dump file area in the second dump file 21 to which the data is written out. The second association structure 40 includes a second dump file management structure 41 for associating, with each other, address information and the like of the second dump file 21 and a plurality of second memory management structures 42 for respectively associating address information of dump file areas in the second dump file 21 and page areas where data written out to the dump file areas are stored and managing the address information.

When a page area in the memory 2 is released in the normal operation after the reboot (YES in S68), the second write-out unit 424 of the OS writes out data stored in the page area to the second dump file 21 (S69). Note that S64 to S69 are the same as S4 to S9 explained with reference to FIG. 4. Therefore, detailed explanation of details of S64 to S69 is omitted.

FIG. 27 is a diagram of a state in which an association table in which page areas in the memory 2 and dump file areas in the second dump file 21 are associated with each other is created and write-out to the second dump file 21 is started. In an example depicted in FIG. 27, as in the processing explained with reference to FIGS. 10 and 11, before the reboot, write-out processing is applied to the second dump file in order to secure an area for performing loading of the OS. In the example depicted in FIG. 27, write-out by the first association structure 30 (including the first dump file management structure 31 and the first memory management structure 32) concerning the first dump file to the second dump file 21 is completed by the write-out processing before the reboot of the information processing apparatus 100.

[Write-Out Resumption Processing]

Figure 28:
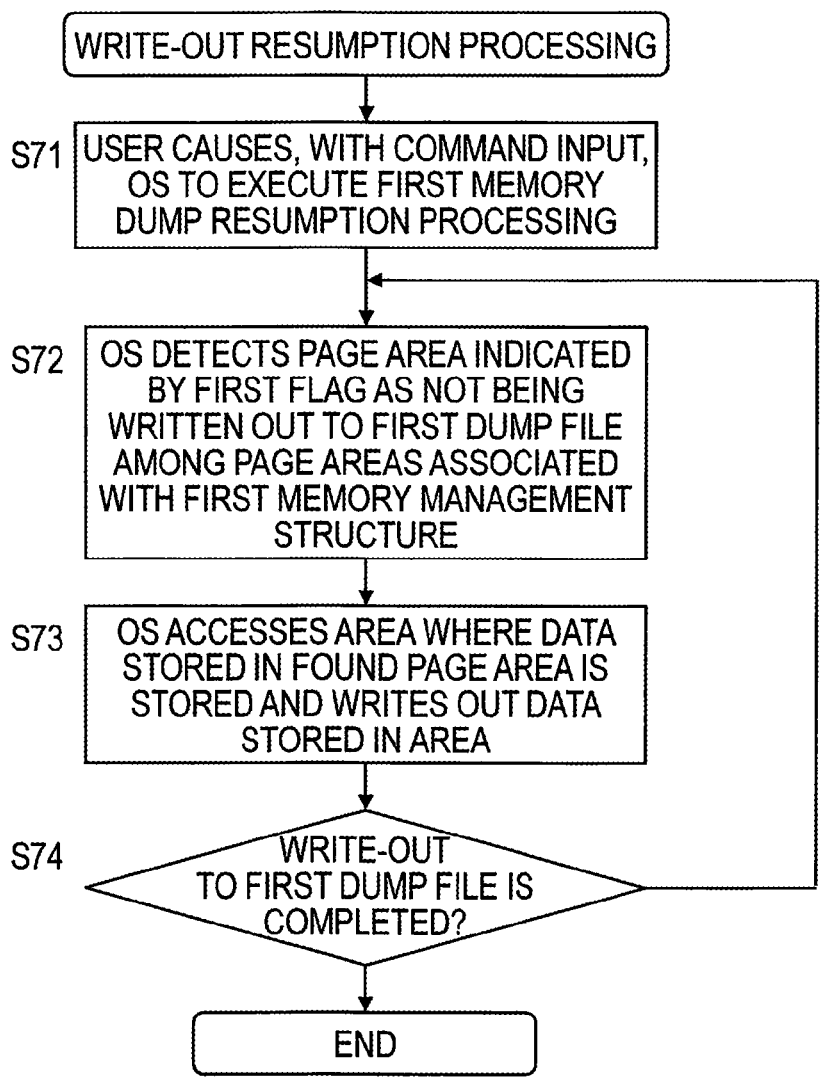
FIG. 28 is a flowchart for explaining write-out resumption processing.
Figure 29:
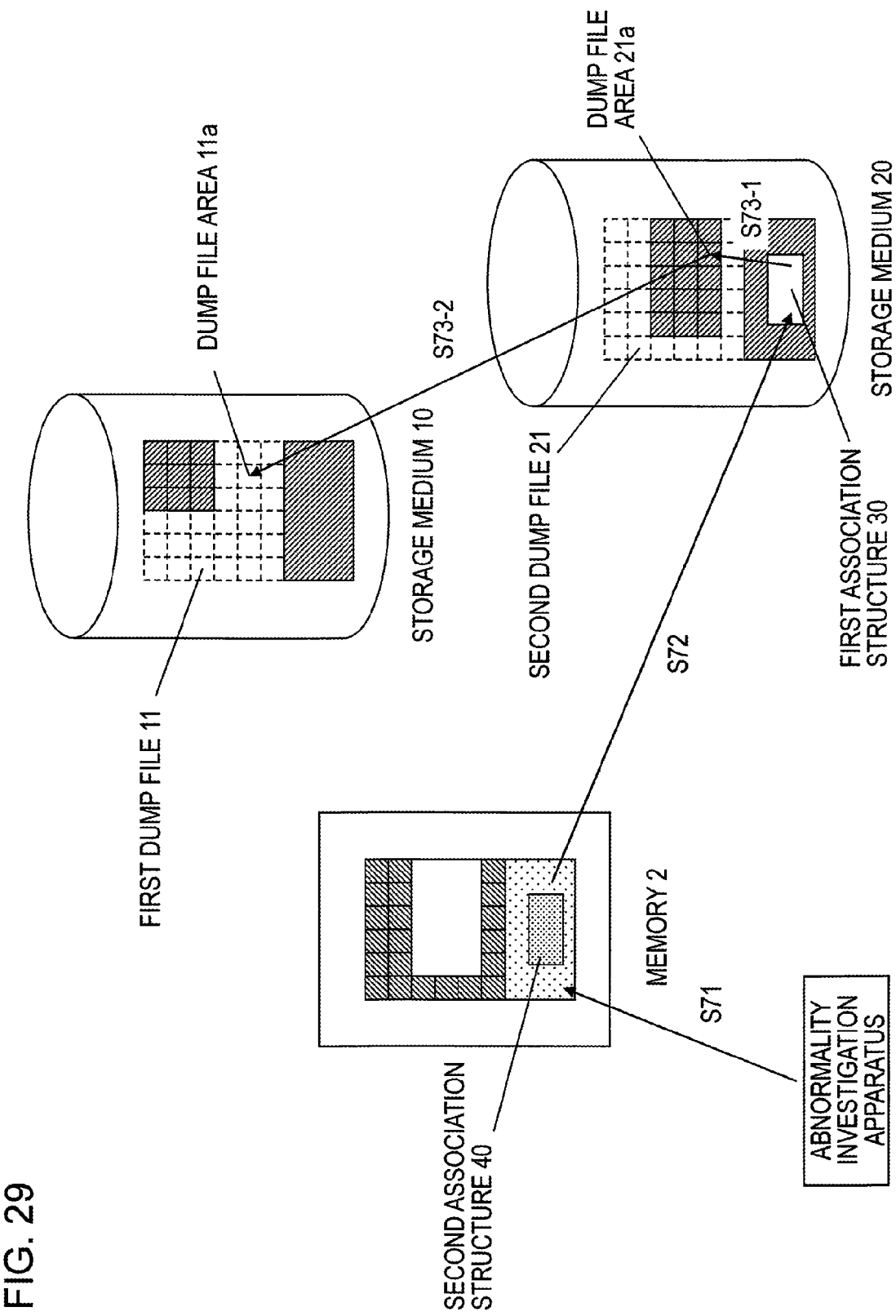
FIG. 29 is a diagram for explaining the write-out resumption processing.
Figure 30:
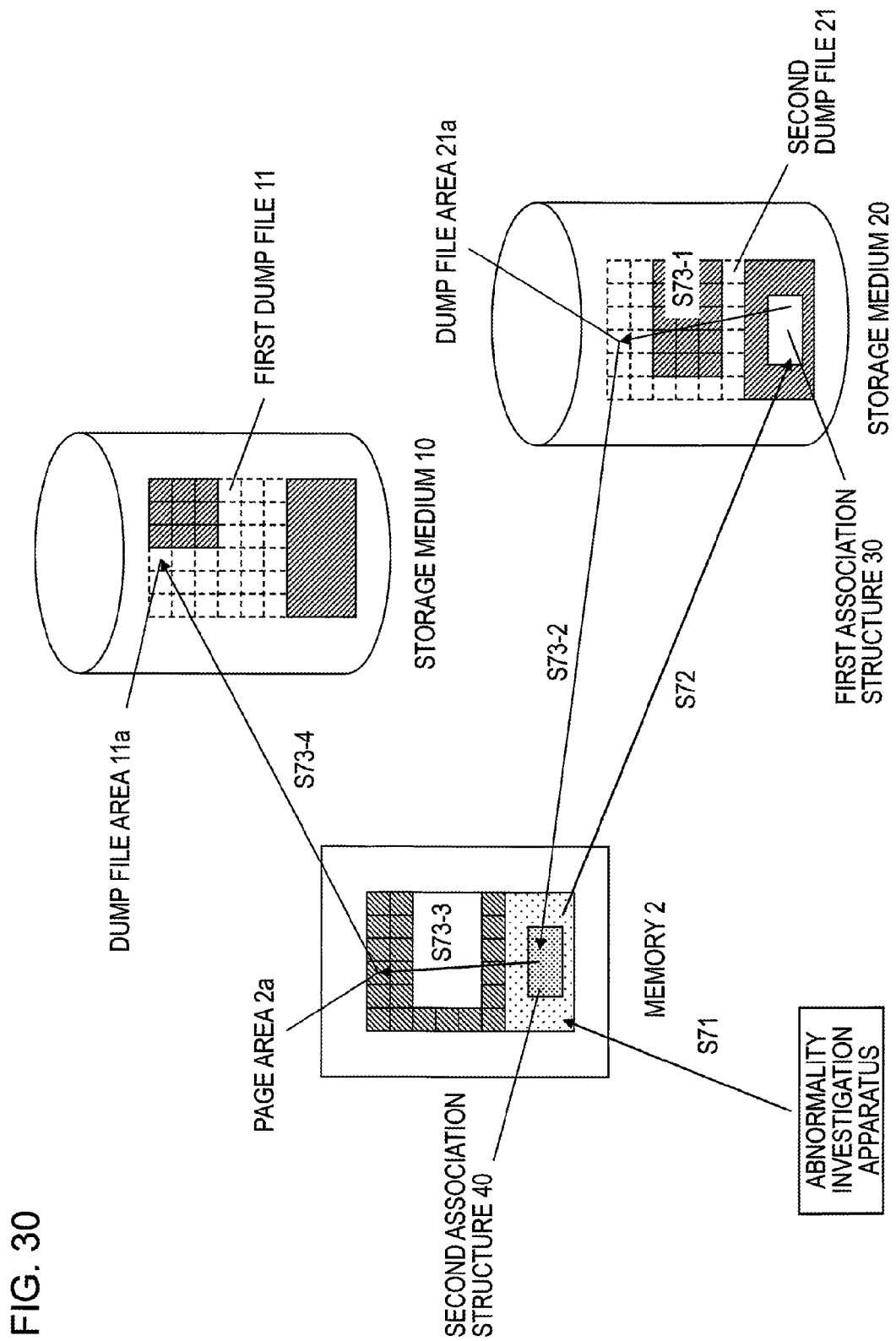
FIG. 30 is a diagram for explaining the write-out resumption processing.

FIG. 28 is a flowchart for explaining write-out resumption processing. FIGS. 29 and 30 are diagrams for explaining the write-out resumption processing. The write-out resumption processing in FIG. 28 is explained with reference to FIGS. 29 and 30. When the OS detects another abnormality different from the abnormality that causes the execution of the abnormality handling processing, the OS executes the abnormality re-handling processing explained with reference to FIG. 24 and suspends the write-out processing to the first dump file 11. The write-out resumption processing is processing for resuming the write-out to the first dump file 11 suspended during the execution of the abnormality re-handling processing.

[S71 in FIG. 28]

First, for example, a user inputs a command for causing the OS to execute the write-out resumption processing. The OS executes the write-out resumption processing in response to the command input (S71). In an example depicted in FIG. 28, the OS resumes the write-out processing to the first dump file 11 in response to the command input by the user. Note that the write-out resumption processing can be executed in parallel to the write-out of the data stored in a page area in the memory 2 to the second dump file 21. Therefore, the command input by the user can be executed at any timing after the re-abnormality processing is executed. For example, the write-out resumption processing may be executed in response to the execution of the abnormality re-handling processing.

It is also possible that a second flag indicating whether the write-out to the first dump file 11 is being executed or already executed (data stored in a page area in the memory 2 is written out to the first dump file 11) is provided in the first dump file 11 and, only when the second flag indicates that the write-out is being executed, the execution of the write-out resumption processing is enabled. Specifically, during the execution of write-out to the first dump file 11, when the OS detects another abnormality different from the abnormality that causes the execution of the abnormality handling processing, the second flag is retained while indicating that the write-out is being executed.

On the other hand, after the write-out to the first dump file 11 is completed, when the OS detects another abnormality different from the abnormality that causes the execution of the abnormality handling processing, the second flag is retained while indicating that the write-out is already executed. The write-out resumption processing only has to be executed only when another abnormality occurs during the execution of the write-out to the first dump file 11. Therefore, the OS executes the write-out resumption processing only when the second flag indicates that the wrote-out is being executed. Note that, for example, the OS may update the second flag such that, before the reboot is executed in S4 or S24, the second flag indicates that the write-out is being executed, and such that, after the write-out of all the data to the first dump file 11 in S9 or S35 is completed, the second flag indicates that the write-out is already executed.

[S72 and S73 in FIG. 28]

Subsequently, the write-out resuming unit 431 of the OS executed in S71 searches for a page area indicating that the first flag is not written out to the first dump file among the page areas associated with the first memory management structure 32 (S72). The write-out resuming unit 431 of the OS accesses an area (a page area in the memory 2 or a dump file area in the second dump file 21) where the data stored in the page area found in S72 is stored and writes out the data stored in the area to the first dump file 11 (S73). Consequently, the suspended write-out to the first dump file 11 is resumed. All data stored in the memory 2 during the first abnormality occurrence (during the occurrence of the abnormality that causes the creation of the first dump file 11) can be written out to the first dump file 11. Therefore, it is possible to resume the investigation of a cause of the abnormality.

In the abnormality re-handling processing, data stored in the memory 2 during second occurrence of abnormality is sequentially written out to the second dump file 21. Therefore, when information in the first memory management structure 32 is searched, if the information in the first memory management structure 32 is written out to the second dump file 21, it is needed to search through the first memory management structure 32 in the second dump file 21. On the other hand, if the information in the first memory management structure 32 is not written out to the second dump file 21, it is needed to search through the first memory management structure 32 in the memory 2.

Concerning the found page area, if the found page area is written out to the second dump file 21, it is needed to access the second dump file 21. On the other hand, if the found page area is not written out to the second dump file 21, it is needed to access a page area in the memory 2.

Note that the write-out resumption processing may be executed after the write-out to the second dump file 21 is completed. S72 and S73 are repeated until write-out of all data that need to be written out to the first dump file 11 is completed (S74).

Operation Example (1) of the Write-Out Resumption Processing

FIG. 29 is a diagram for explaining the write-out resumption processing executed when the found page area is stored in the second dump file 21. Note that, in an example depicted in FIG. 29, the first memory management structure 32 (the first association structure 30) is already written out to the second dump file 21. As depicted in FIG. 29, the write-out resumption processing is executed, for example, when an investigation terminal inputs a command for causing the OS to execute the write-out resumption processing to the OS and the OS responds to the command input (S71).

Subsequently, the executed write-out resumption unit 431 of the OS searches for a page area indicated by the first flag as not being written out to the first dump file 11 among the page areas associated with the first memory management structure 32 (S72). As explained with reference to FIG. 22, the first memory management structure 32 is erased when data stored in a page area is released. Therefore, in a page area where the first memory management structure 32 is present, it is likely that data that needs to be written out is stored. The write-out resuming unit 431 of the OS searches for a page area corresponding to the first memory management structure 32 indicated by the first flag as being in the unwritten-out state among the found first memory management structure 32. In the example depicted in FIG. 29, the OS in the memory 2 searches through the first association structure 30 written out to the second dump file 21 (S72).

Further, the OS accesses an area where data stored in the found page is stored and writes out the data stored in the accessed area to the first dump file 11 (S73). In the example depicted in FIG. 29, the found page area is already written out to the second dump file 21. Therefore, the OS accesses the data stored in a dump file area in the second dump file 21 (S73-1) and writes out the accessed data to the first dump file 11 (S73-2). Note that a data size of the first dump file 11 and the second dump file 21 is the same as the data size of the memory 2. An offset position (a storage position) of the dump file area 11a to which data is written out in the first dump file 11 and an offset position of a dump file area 21a to which data is written out in the second dump file 21 have the same offset value. Therefore, the write-out resuming unit 431 of the OS accesses the dump file area 21a in the second dump file 21 on the basis of an offset value of the dump file area 11a indicated by the first flag as being in the unwritten-out state. If data is not written out to the dump file area 21a (when the second memory management structure 42 for the second dump file 21 is absent), the write-out resuming unit 431 writes out the data to the same dump file area 11a in the first dump file 11.

Operation Example (2) of the Write-Out Resumption Processing

FIG. 30 is a diagram for explaining the write-out resumption processing executed when the found page area is not stored in the second dump file 21. In an example depicted in FIG. 30, unlike the example depicted in FIG. 29, the page area found in S72 is not written out to the second dump file 21. Therefore, when the OS accesses the dump file area 21a in the second dump file 21 referring to the first memory management structure 32 (the first association structure 30), the OS is unable to acquire data (S73-1).

Therefore, in the write-out resumption processing, the OS accesses, further referring to the second memory management structure 42 stored in the OS in the memory 2 (S73-2), the page area 2a in the memory 2 corresponding to the accessed dump file area 21a (S73-3). Consequently, in the write-out resumption processing, it is possible to access the found page area and write out the data stored in the found page area to the first dump file 11 (S73-4). Note that S71 and S72 are the same as the example explained with reference to FIG. 29. Therefore, explanation of S71 and S72 is omitted.

[Write-Out Processing in the Abnormality Re-Handling Processing]

Figure 31:
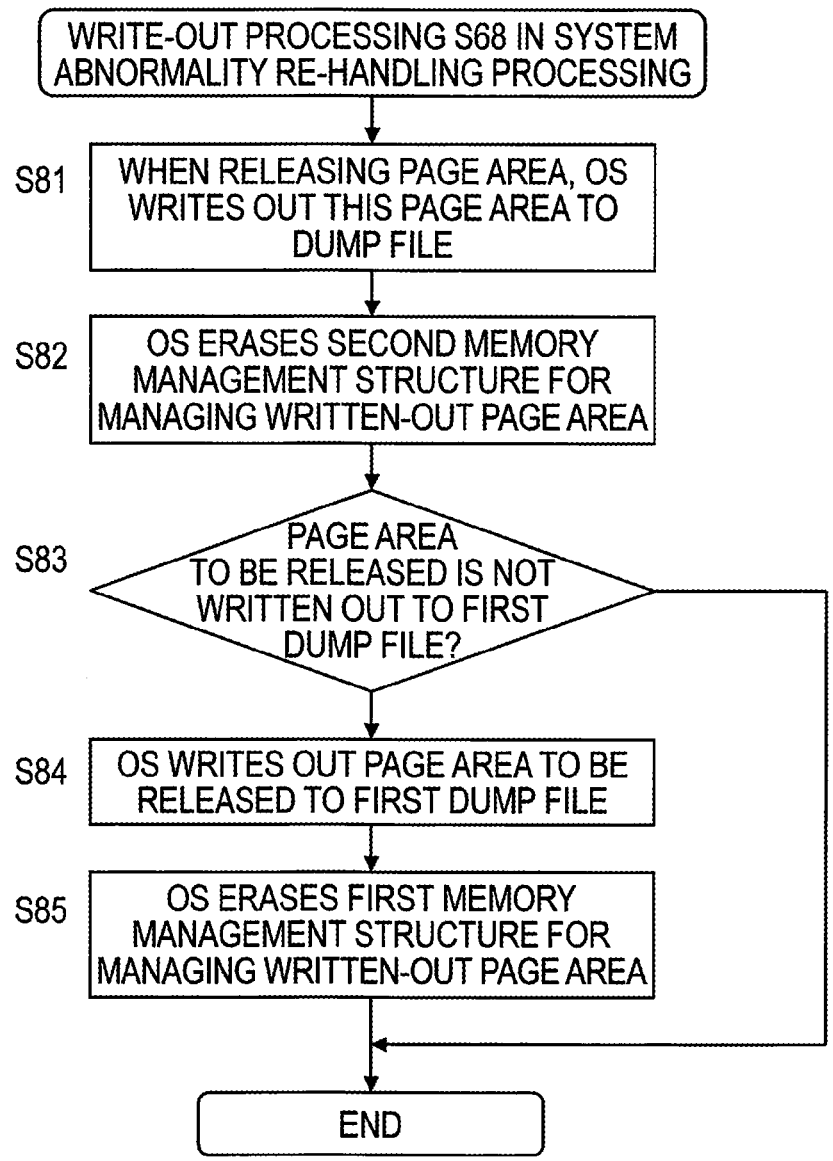
FIG. 31 is a flowchart for explaining the write-out processing S68 in the abnormality re-handling processing.
Figure 32:
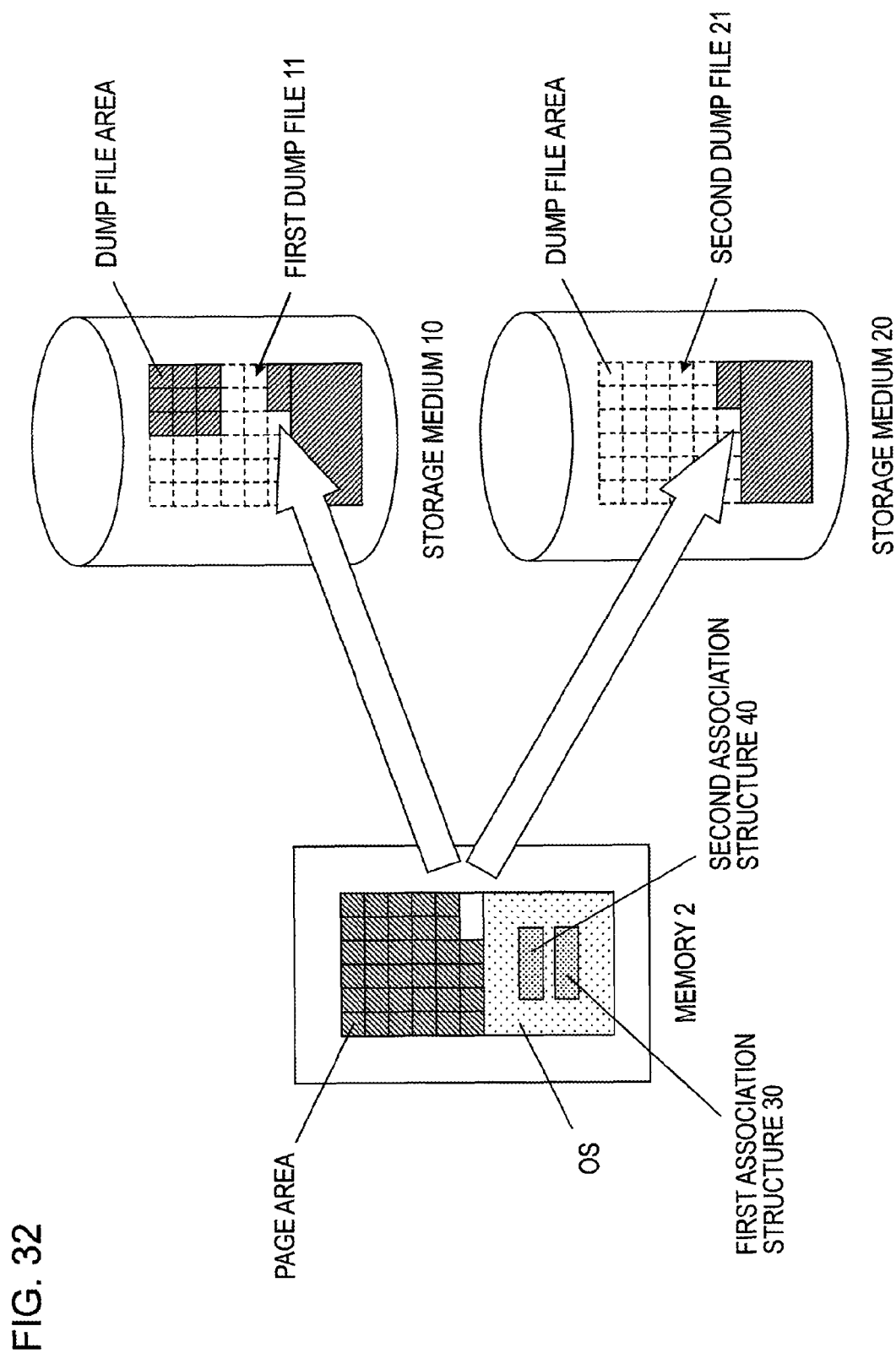
FIG. 32 is a diagram for explaining the write-out processing S68 in the abnormality re-handling processing.

FIG. 31 is a flowchart for explaining the write-out processing S68 in the abnormality re-handling processing. FIG. 32 is a diagram for explaining the write-out processing S68 in the abnormality re-handling processing. The write-out processing S68 in the abnormality re-handling processing in FIG. 31 is explained with reference to FIG. 32. The write-out resumption processing explained with reference to FIG. 28 is processing for resuming, for example, according to a command input from the user, at any timing, the write-out processing to the first dump file 11 suspended by the execution of the abnormality re-handling processing. On the other hand, in the write-out processing in the abnormality re-handling processing in FIG. 31, the write-out processing to the first dump file 11 is also performed when the write-out processing to the second dump file 21 is performed in the abnormality re-handling processing. Therefore, in an example depicted in FIG. 31, the information processing apparatus 100 includes a second write-out unit 424 capable of executing the write-out processing in the abnormality re-handling processing explained with reference to FIG. 31 instead of the write-out resuming unit 431 that executes the write-out resumption processing explained with reference to FIG. 28.

In the write-out processing in the abnormality re-handling processing, first, when releasing a page area, the OS performs writes out the page area to the second dump file 21 (S81) and erases the second memory management structure 42 for managing the written-out page area (S82). The steps so far are the same as the abnormality re-handling processing explained with reference to FIG. 24.

Subsequently, when the page to be released is not written out to the first dump file 11 (YES in S83), in the write-out processing S68, the OS writes out data stored in the page area to be released to the first dump file 11 as well (S84). The OS erases the first memory management structure 32 for managing the written-out page area (S85). On the other hand, when the page area to be released is written out to the first dump file 11 (NO in S83), the OS does not write out the data to the first dump file 11.

As depicted in FIG. 32, in the write-out processing in the abnormality re-handling processing explained herein, the OS in the memory 2 includes the first memory management structure 32 and the second memory management structure 42 (the first association structure 30 and the second association structure 40). Specifically, when the abnormality re-handling processing is executed, the first memory management structure 32 is stored in the OS after the reboot. Consequently, when the release of the memory 2 occurs, it is possible to perform write-out to both of the first dump file 11 and the second dump file 21.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium that stores therein an investigation program for causing an information processing apparatus to execute processing comprising:
    creating, in a storage medium, a first dump file for writing out data in a memory in the information processing apparatus when an operating system detects a first abnormality;
    rebooting the information processing apparatus without erasing the data stored in the memory after the detection of the first abnormality and after the creation of the first dump file;
    creating, during the reboot, a first table that associates a plurality of page areas in the memory and a plurality of dump file areas in the first dump file that correspond to the page areas; and
    writing out, when a page area in the memory is released, data stored in the page area being released to the first dump file.

2. A non-transitory computer readable storage medium according to claim 1, wherein the processing further comprises accessing, in response to access to the first dump file from the information processing apparatus or another information processing apparatus different from the information processing apparatus, the memory or the first dump file by referring to the first table.

3. A non-transitory computer readable storage medium according to claim 1, wherein the processing further comprises
    writing out, before the rebooting, data stored in the page area having a size equivalent to an area for the reboot of the operating system to the first dump file, and
    in the processing for creating the first table, the first table is created concerning a page area whose data is not written out to the first dump file.

4. A non-transitory computer readable storage medium according to claim 1, wherein the processing further comprises:
    creating, in the storage medium, a second dump file for writing out the data in the memory, when detecting a second abnormality different from the first abnormality during the writing out of the data to the first dump file;
    rebooting the information processing apparatus without erasing the data stored in the memory after creating the second dump file;
    creating, during the reboot, a second table that associates a plurality of page areas in the memory and a plurality of dump file areas in the second dump file that correspond to the page areas;
    accessing, in response to access to the first dump file from the information processing apparatus or another information processing apparatus different from the information processing apparatus, the memory or the second dump file referring to the second table; and writing out, when a page area in the memory is released, data stored in the page area being released to the second dump file.

5. A non-transitory computer readable storage medium according to claim 1, wherein
in the processing for creating the first dump file, a first dump file management structure for managing address information of the first dump file is created when the first dump file is created, and
in the processing for creating the first table, a plurality of first memory management structures respectively including address information of the page areas and the dump file areas are created as the first table.

6. A non-transitory computer readable storage medium according to claim 5, wherein
the first memory management structures each include a first flag indicating whether the data stored in the page area is not written out to the first dump file, and
in the processing for creating the first table, when the first memory management structure is created, the first flag is set to indicate that the data stored in the page area is not written out to the dump file area.

7. A non-transitory computer readable storage medium according to claim 6, wherein, in the processing for writing out the data to the first dump file, when the page area managed by the first memory management structure is released and in the case where the first flag indicates that the data is not written out to the dump file area, data stored in the page area to be released is written out to the dump file area.

8. A non-transitory computer readable storage medium according to claim 6, wherein the processing further comprises:
creating, in the storage medium, a second dump file for writing out the data in the memory, when detecting a second abnormality different from the first abnormality during the writing out of the data to the first dump file;
rebooting the information processing apparatus without erasing the data stored in the memory after creating the second dump file;
creating, during the reboot, a second table that associates a plurality of page areas in the memory and a plurality of dump file areas in the second dump file that correspond to the page areas;
accessing, in response to access to the first dump file from the information processing apparatus or another information processing apparatus different from the information processing apparatus, the memory or the first dump file referring to the second table;
writing out, when a page area in the memory is released, data stored in the page area being released to the second dump file; and
resuming the write-out, to the first dump file, of data stored in a page area indicated by the first flag as not being written out to the first dump file among the page areas associated by the first memory management structure.

9. A non-transitory computer readable storage medium according to claim 8, wherein
the first dump file includes a second flag indicating whether the write-out to the first dump file is being executed or is already executed, and
in the processing for resuming the write-out to the first dump file, the write-out to the first dump file is executed when the second flag indicates that the write-out is being executed.

10. A non-transitory computer readable storage medium according to claim 9, wherein
before rebooting the information processing apparatus when the first abnormality is detected, the second flag is set to indicate that the write-out is being executed, and
after writing out of the data to the first dump file, the second flag is set to indicate that the write-out is already executed.

11. An information processing apparatus, comprising:
a processor configured to execute a processing, the processing comprising:
creating, in a storage medium, a first dump file for writing out data in a memory in the information processing apparatus when an operating system detects a first abnormality;
rebooting the information processing apparatus without erasing the data stored in the memory after the detection of the first abnormality and after the creation of the first dump file;
creating, during the reboot, a first table that associates a plurality of page areas in the memory and a plurality of dump file areas in the first dump file that correspond to the page areas; and
writing out, when a page area in the memory is released, data stored in the page area being released to the first dump file.

12. An information processing method, comprising:
creating, in a storage medium, a first dump file for writing out data in a memory in the information processing apparatus when an operating system detects a first abnormality;
rebooting the information processing apparatus without erasing the data stored in the memory after the detection of the first abnormality and after the creation of the first dump file;
creating, during the reboot, a first table that associates a plurality of page areas in the memory and a plurality of dump file areas in the first dump file that correspond to the page areas; and
writing out, when a page area in the memory is released, data stored in the page area being released to the first dump file.

* * * * *